(12) United States Patent
Kawasaki

(10) Patent No.: US 7,391,483 B2
(45) Date of Patent: Jun. 24, 2008

(54) LIQUID CRYSTAL DISPLAY DEVICE AND MANUFACTURING METHOD

(75) Inventor: Kiyohiro Kawasaki, Osaka (JP)

(73) Assignee: Quanta Display Japan Inc., Chuo-ku, Osaka (JP)

( * ) Notice: Subject to any disclaimer, the term of this patent is extended or adjusted under 35 U.S.C. 154(b) by 340 days.

(21) Appl. No.: 10/995,418

(22) Filed: Nov. 24, 2004

(65) Prior Publication Data

US 2005/0185126 A1  Aug. 25, 2005

(30) Foreign Application Priority Data

Nov. 27, 2003  (JP)  .............................. 2003-396558

(51) Int. Cl.
    *G02F 1/136*  (2006.01)
(52) U.S. Cl. ............................................ 349/43; 349/42
(58) Field of Classification Search ........................ None
    See application file for complete search history.

(56) References Cited

U.S. PATENT DOCUMENTS 6,323,051 B1 * 11/2001 Shimada ...................... 438/30

* cited by examiner

*Primary Examiner*—Andrew Schechter
*Assistant Examiner*—Lucy Chien
(74) *Attorney, Agent, or Firm*—Bacon & Thomas PLLC

(57) ABSTRACT

Four-mask and three-mask process for TN-type liquid crystal display made with combination of the formation process of the signal line and the formation process of the pixel electrode by forming a signal line of a laminate of a transparent conductive layer and a low-resistance metal layer and a pseudo-pixel electrode, removing a low resistance metal layer on the pseudo-pixel electrode during formation of an opening in a passivation insulating layer to obtain a pixel electrode having a transparent conductive layer. Contact formation process by removing the gate insulating layer during formation of the semiconductor layer, and the formation process of the contact and the formation process of the semiconductor layer, or the formation process of the scan line and the formation process of the contact or the formation process of the scan line and the formation process of the semiconductor layer by introducing half-tone exposure technology.

11 Claims, 24 Drawing Sheets

LIQUID CRYSTAL DISPLAY DEVICE AND MANUFACTURING METHOD

BACKGROUND OF THE INVENTION

1. Field of the Invention

The present invention relates to a liquid crystal display device with a color image display function, and in particular to an active-type liquid crystal display device.

2. Description of Related Art

Televisions and various other image display devices are being provided on a commercial base that has a liquid crystal display 5 to 50 cm in diagonal length in mass quantity through the progress in recent years in micro-fabrication, liquid crystal material, high-density packaging technology, and other such technologies. In addition, color displays can easily be obtained by forming an RGB color layer on one of the two glass substrates composing the liquid crystal panel. In particular, in a so-called active liquid crystal panel with a switching element inside each pixel, there is little cross-talk, the response rate is high, and images with a high contrast ratio are guaranteed.

For these liquid crystal displays (liquid crystal panels), the matrix organization generally comprises from 200 to 1200 scan lines and from around 300 to 1600 signal lines, but recently increases in screen size and definition are progressing simultaneously in response to the increase in display capacity.

FIG. 18 shows a prospective state of liquid crystal panel packaging in which electric signals are provided to an image display part using packaging means such as COG (Chip-On-Glass) in which a conductive adhesive is used to connect semiconductor integrated-circuit chips 3 for supplying a drive signal to electrode terminals 5 of the scan lines formed on one of the transparent insulating substrates composing a liquid crystal panel 1, for example a glass substrate 2, or TCP (Tape-Carrier-Package) for fixing a TCP film 4, to electrode terminals 6 of the signal lines using pressure and a suitable adhesive including a conductive medium using, for example, a thin polyimide-base plastic film with copper foil terminals plated with gold or solder as a base. Herein, both of these packaging methods are shown at the same time for convenience, but in actual practice, either method may be arbitrarily selected.

Wire paths connecting the interval between the pixels in the image display portion positioned nearly in the center of a liquid crystal panel 1 and terminals 5 and 6 of the scan line and the signal line are 7 and 8, and do not necessarily need to be constructed of the same conductive material as the electrode terminal groups 5 and 6. 9 is a color filter or an opposing glass substrate that is another transparent insulating substrate having transparent conductive opposing electrodes on its opposing side, which is common to all the liquid crystal cells.

FIG. 19 shows an equivalent circuit of an active-type liquid crystal display device with an insulating gate-type transistor 10 disposed as a switching element at each pixel. In the figure, 11 (7 in FIG. 18) is a scan line, 12 (8 in FIG. 18) is a signal line, 13 is a liquid crystal cell, and the liquid crystal cell 13 is treated as a capacitance element electrically. The elements drawn with solid lines are formed on the glass substrate 2, one of the glass substrates composing the liquid crystal panel 1, and opposing electrodes 14 drawn with dotted lines common to all the liquid crystal cells 13 are formed on the main surface of the other glass substrate 9 opposite the glass substrate 2. If the off resistance of the insulating gate-type transistor 10 or the resistance of the liquid crystal cell 13 is low, or if gradation in the displayed image is to be emphasized, circuitry means may be introduced such as adding an auxiliary storage capacitor 15 in parallel with the liquid crystal 13 as a load to increase the time constant thereof. 16 is a storage capacitor line forming a mother line common to the storage capacitors 15.

FIG. 20 shows a cross-sectional view of the essential part of an image display part of a liquid crystal display device. The two glass substrates 2 and 9 composing the liquid crystal panel 1 are formed separated by a specified distance of several μm by a spacer material (not illustrated) such as pillar-shaped resin spacers formed on the color filter 9, or plastic fibers or beads, and that gap is a closed space, sealed by a sealing material and a second end sealing material (neither of which are illustrated) made from an organic resin at the periphery of the glass substrate 9, and the gap is filled with liquid crystal 17.

To realize a color display, a thin organic film about 1 to 2 μm thick containing either a dye or pigment or both called a color layer 18 is deposited on the closed space side of the glass substrate 9, providing a color display function, in which case the glass substrate 9 may also be referred to by the name color filter (abbreviated as CF). Depending on the nature of the liquid crystal material 17, a polarization plate 19 is attached to the top of the glass substrate 9 or the bottom of the glass substrate 2 or both, so the liquid crystal panel 1 functions as an electro-optical element. TN (Twisted Nematic)-type liquid crystal material is currently used in most liquid crystal panels available commercially, and two polarization plates 19 are normally required. Although not illustrated, a back light source is disposed as a light source in the transmission-type liquid crystal panel, irradiating white light from below.

A thin polyimide-type resin film 20 about 0.1 μm thick, for example, formed on the two glass substrates 2 and 9 and in contact with the liquid crystal 17 is an alignment film for orientating liquid crystal molecules in a fixed direction. 21 is a drain electrode (wire) for connecting a drain of the insulating gate-type transistor 10 and a transparent conductive pixel electrode 22, and is often formed at the same time as a signal line (source line) 12. A semiconductor layer 23 is positioned between the signal line 12 and the drain electrode 21 and is described in further detail below. A thin Cr film layer 24 about 0.1 μm thick formed at the boundary of the adjacent color layer 18 on the color filter 9 is a light shield material for preventing external light from irradiating the semiconductor layer 23, the scan line 11, or the signal line 12. This is an established technology referred to as black matrix (abbreviated as BM).

Next, a description is given of the structure of an insulating gate-type transistor as a switching element and a manufacturing method thereof. Two types of insulating gate-type transistors are currently used commonly, one of which will be introduced as a conventional example and be referred to as an etch-stop type. FIG. 21 is a plan view of a unit pixel of an active substrate (semiconductor device for display devices) composing a conventional liquid crystal panel. Cross-section views of lines A-A', B-B' and C-C' in FIG. 21(e) are shown in FIG. 22. The manufacturing process thereof is described briefly below.

First, as shown in FIG. 21(a) and FIG. 22(a), a first metal layer about 0.1 to 0.3 μm thick is deposited using an SPT (sputter) or other such vacuum film-depositing equipment on the main surface of the glass substrate 2, for example, product number 1737 manufactured by Corning, Inc., about 0.5 to 1.1 mm thick, as an insulating substrate with high-heat resistance, high chemical-resistance and high transparency, and the scan line 11 doubling as a gate electrode 11A and the storage capacitor line 16 are selectively formed using microfabrication technology. The material for the scan lines may be selected taking into consideration the combined properties of heat-resistance, chemical-resistance, hydrofluoric acid-resistance and conductance, though a metal or an alloy with a high heat resistance such as a Cr, Ta or MoW alloy, and a silicide thereof is generally used.

While using Al (aluminum) as the material for the scan lines is reasonable for lowering the resistance value of the scan lines in response to the larger screens and higher definition of liquid crystal panels, by itself, Al has a low heat resistance, so adding an oxide layer (Al2O3) in anodization of the Al surface or laminating with Cr, Ta or Mo or a silicide thereof, which are the said heat resistance metals, is currently the general technology in use. In other words, the scan lines 11 are constructed of one or more metal layers.

Next, a PCVD (Plasma-Chemical Vapor Deposition) equipment is used to successively deposit three thin film layers about 0.3, 0.05, and 0.1 μm thick, for example, comprising a first SiNx (silicon nitride) layer 30 composing a gate insulating layer, a first amorphous silicon (a-Si) layer 31 composing a channel for an insulating gate-type transistor including almost no impurities, and a second SiNx layer 32 composing an insulating layer for protecting the channel, over the entire surface of the glass substrate 2, and micro-fabrication technology is used to selectively leave the second SiNx layer above the gate electrode 11A narrower than the gate electrode 11A to form a protection layer 32D as shown in FIGS. 21(b) and 22(b), exposing the first amorphous silicon layer 31.

Continuing, the second amorphous silicon layer 33 including phosphorous, for example, as an impurity is deposited similarly about 0.05 μm thick, for example, over the entire surface using a PCVD equipment. Then, a thin film layer 34 of, for example, Ti, Cr, Mo or the like, is deposited as a heat-resistant metal layer about 0.1 μm thick, an Al thin film layer 35 about 0.3 μm thick is deposited as a low resistance wiring layer, and a Ti thin film layer, for example, is deposited as an intermediate conductive layer about 0.1 μm thick using an SPT or other vacuum film-depositing equipment as shown in FIG. 21(c) and FIG. 22(c). A drain electrode 21 of an insulating gate-type transistor and a signal line 12 doubling as a source electrode, comprising a laminate made of the three thin film layers 34A, 35A and 36A, which are source-drain materials, are selectively formed with micro-fabrication technology. This selective patterning is made by successively etching the Ti thin film layer 36, the Al thin film layer 35 and the Ti thin film layer 34 using a photosensitive resin pattern used in forming the source and drain wires as a mask, and then removing the second amorphous silicon layer 33 between the source and drain electrodes 12 and 21 to expose the second SiNx layer 32D as well as by removing the first amorphous silicon layer 31 in other regions to expose the gate insulating layer 30. The second SiNx layer 32D is thus present as a channel protective layer, and the etching of the second amorphous silicon layer 33 automatically ends, so this manufacturing method is referred to as etch-stopping.

Next, after removing the said photosensitive resin pattern, an SiNx layer about 0.3 μm thick is deposited over the entire surface of the glass substrate 2 similarly to the gate insulating layer as a transparent insulating layer using a PCVD equipment to form a passivation insulating layer 37, the passivation insulating layer 37 is selectively removed using micro-fabrication technology to form an opening 62 on the drain electrode 21, an opening 63 on the scan line 11 and an opening 64 on the signal line 12 outside an image display region, as shown in FIGS. 21(d) and 22(d), partially exposing the drain electrode 21, the scan line 11 and the signal line 12. An opening 65 is formed similarly on the electrode pattern bundled and in parallel with the storage capacitor line 16 to expose part of the storage capacitor line 16.

Finally, ITO (Indium-Tin-Oxide) or IZO (Indium-Zinc-Oxide), for example, is deposited as a transparent conductive layer about 0.1 to 0.2 μm thick using an SPT or other vacuum film-depositing equipment, and a pixel electrode 22 is selectively formed using micro-fabrication technology on the passivation insulating layer 37 containing the opening 62 to complete the active substrate 2 as shown in FIGS. 21(e) and 22(e). The portion of the scan line 11 exposed in the opening 63 may be used as the electrode terminal 5, and the portion of the signal line 12 exposed in the opening 64 as the electrode terminal 6, and the electrode terminals 5A and 6A made from ITO on the passivation insulating layer 37 containing the openings 63 and 64 may be selectively formed as illustrated, but a transparent conductive short line 40 is ordinarily formed at the same time connected between the electrode terminals 5A and 6A. The reason for this is so a high resistance can be made as a measure against static electricity by forming the interval between the electrode terminals 5A and 6A and the short wire 40 into a long, narrow striped forms to increase the resistance (not illustrated). Similarly, an electrode terminal is formed in the storage capacitor line 16 containing the opening 65, though a number thereof is not provided.

If wiring resistance of the signal wire 12 is not a problem, a low resistance wire layer 35 made from Al is not necessarily required, in which case it is possible to simplify the layers of the source and drain wires 12 and 21 by selecting a heat-resistant metal material such as Cr, Ta or Mo. Ensuring an electrical connection with the second amorphous silicon layer using a heat-resistant metal layer is thus more important for the source and drain wires; the heat resistance of an insulating gate-type transistor is described in detail in Unexamined Patent Application Number H 7-74368 [i.e., 1995-74368] as an example of prior art. A region 50 (a right-slanting oblique portion) over which the storage capacitor line 16 and the drain electrode 21 are superimposed in a planar manner via the gate insulating layer 30 in FIG. 21(c) forms a storage capacitor 15, though a detailed description is omitted here.

A detailed history of the five-mask process described above is omitted, but this is obtained as the result of streamlining the semiconductor layer islanding process and decreasing the number of contacts formation processes by one. Photomasking, which initially required seven to eight processes, has been reduced to the current five layers by the introduction of dry etching technology which greatly contributes to the decreasing process costs. It is a well-known target of development that lowering the process cost in the manufacture of the active substrate and the material cost in the panel assembly and module packaging processes is effective in lowering the production costs of liquid crystal display devices. To lower process costs, either processes may be eliminated to make the process shorter, or inexpensive process development or process replacement to inexpensive process is available. Here, a four-mask process resulting in an active substrate with four photomasks is described as an example of eliminating processes. The photo-etching process is eliminated by introducing half-tone exposure technology. FIG. 23 shows a plan view of a unit pixel in an active substrate corresponding to the four-mask process. The cross-section views of lines A-A', B-B' and C-C' in FIG. 23(e) are shown in FIG. 24. As already mentioned, two types of insulating gate-type transistors are commonly in use currently. Here, a channel etch type insulating gate-type transistor is used.

First, as shown in FIGS. 23(a) and 24(a), a first metal layer about 0.1 to 0.3 μm thick is deposited on the main surface of a glass substrate 2 using an SPT or other vacuum film-depositing equipment similar to that done in the five-mask process, and a storage capacitor line 16 and a scan line 11 doubling as a gate electrode 11A are selectively formed with micro-fabrication technology.

Next, three thin film layers comprising a first SiNx layer 30 composing a gate insulating layer, a first amorphous silicon layer 31 composing a channel for an insulating gate-type transistor including hardly any impurities, and a second amorphous silicon layer 33 composing a source and drain for an insulating gate-type transistor including impurities are successively deposited about 0.3 to 0.2 to 0.05 μm, for example, over the entire surface of the glass substrate 2 using a PCVD equipment. Next, a Ti thin film layer 34, for example, as a heat-resistant metal layer about 0.1 μm thick, an Al thin film layer 35 as a low resistance wire layer about 0.3 μm thick, and a Ti thin film layer, for example, as an intermediate conductive layer about 0.3 μm thick, that is, source-drain wire material is successively deposited using an SPT or other vacuum film-depositing equipment, and a drain electrode 21 for an insulating gate-type transistor and a signal line 12 doubling as a source electrode are selectively formed using micro-fabrication technology. In this selective patterning, forming photosensitive resin patterns 80A and 80B thinner than the 3 μm of the source-drain wire formation regions 80A (12) and 80A (21) with the channel formation region 80B (oblique portion) between the source and drain 1.5 μm thick, for example, as shown in FIGS. 23(b) and 24(b) using halftone exposure technology is a major feature.

For such photosensitive resin patterns 80A and 80B, a positive photosensitive resin is ordinarily used in the production of substrates for liquid crystal display devices, so a black, that is, a thin Cr film is formed for a source-drain wire formation region 80A, a gray (gray tone) line and space Cr pattern is formed with a width of 0.5 to 1 μm, for example, for a channel region 80B, and for other regions, a photomask may be used to make them white, that is, remove the thin Cr film. It is possible to transmit about half of the photomask radiant light from a lamp source because the fine lines and spaces are not resolved due to the lack of resolution with an aligner, so the photosensitive resin patterns 80A and 80B may be obtained in the gray region having a cross-section form such as that shown in FIG. 24(b) corresponding to the residual film properties of the positive type photosensitive resin. By depositing an MoSi2 thin film having different thickness from Cr thin film, for example, rather than a Cr thin film slit in the gray region, a photomask with an equivalent function may be obtained.

After successively etching the Ti thin film layer 36, the Al thin film layer 35, the Ti thin film layer 34, the second amorphous silicon layer 33 and the first amorphous silicon layer 31 using the aforementioned photosensitive resin patterns 80A and 80B as masks to expose the gate insulating layer 30 as shown in FIG. 24(b), the photosensitive resin patterns 80A and 80B are decreased at least 1.5 μm with ashing means such as oxygen plasma, eliminating the photosensitive resin pattern 80B to expose the channel region, and leaving the reduced photosensitive resin patterns 80C (12) and 80C (21) only on the source-drain wires formation region as shown in FIGS. 23(c) and 24(c). The Ti thin film layer, Al thin film layer, Ti thin film layer, second amorphous silicon layer 33A, and first amorphous silicon layer 31A between the source-drain wires (the channel formation region) are successively etched using the thinned photosensitive resin patterns 80C (12) and 80C (21) as masks again, and then the first amorphous silicon layer 31A is etched leaving around 0.05 to 0.1 μm. After the source and drain wire materials are etched, the first amorphous silicon layer 31A is etched leaving around 0.05 to 0.1 μm, thereby forming the source-drain wires, so the insulating gate-type transistor obtained with such a manufacturing method is referred to as a channel etch. The resist pattern 80A is reduced so as to be converted to 80C in the said plasma treatment, so it is desirable to strengthen the anisotropicity to suppress changes in the pattern dimensions. In further detail, RIE (Reactive Ion Etching) oxygen plasma treatment is desirable, and ICP (Inductive Coupled Plasma), or TCP (Transfer Coupled Plasma) oxygen plasma treatment with a higher density plasma source is even more desirable.

After removing the said photosensitive resin patterns 80C (12) and 80C (21), a second SiNx layer about 0.3 μm thick is deposited as a transparent insulating layer over the entire surface of the glass substrate 2 to make a passivation insulating layer 37 as shown in FIGS. 23(d) and 24(d) similar to the five-mask process; openings 62, 63 and 64 are formed on the drain electrode 12, on the scan line 11 and on the signal line 12 outside an image display region, respectively; the gate insulating layer 30 and the passivation insulating layer 37 in the opening 63 are removed to expose part of the scan line in the opening 63; and the passivation insulating layer 37 in the openings 62 and 64 is removed to expose part of the drain electrode 21 in the opening 62 and part of the signal line in the opening 64.

Finally, ITO or IZO, for example, is deposited as a transparent conductive layer about 0.1 to 0.2 μm thick using an SPT or other vacuum film-depositing equipment, and a pixel electrode 22 containing the opening 62 is selectively formed on the passivation insulating layer 37 using micro-fabrication technology to complete the active substrate 2 as shown in FIGS. 23(e) and 24(e). For the electrode terminals, transparent conductive electrode terminals 5A and 6A made from ITO are selectively formed on the passivation insulating layer 37 containing the openings 63 and 64.

SUMMARY OF THE INVENTION

In this manner, the contact formation processes for the drain electrode 21 and the scan line 11 are carried out at the same time in both the five-mask and four-mask processes, so the thickness and type of the insulating layers in the openings 62 and 63 corresponding thereto differ. The film deposition temperature is lower and the film quality inferior in the passivation insulating layer 37 than in the gate insulating layer 30, the etching rate when using a hydrofluoric acid etching liquid differs by a magnitude of 10 at several thousand Å/minute and several hundred Å/minute respectively, and because the hole diameter cannot be controlled due to an excess of over-etching on the top of the cross-sectional shape of the opening 62 on the drain electrode 21, dry etching utilizing a fluoride gas is used.

Even if dry etching is used, the opening 62 on the drain electrode 21 is only in the passivation insulating layer 37, so unlike the opening 63 of the scan line 11, over-etching of the opening 62 cannot be avoided, and depending on the material, the intermediate conductive layer 36A may be reduced by the etching gas. In the removal of the photosensitive resin pattern after the etching is complete, about 0.1 to 0.3 μm of the surface of the photosensitive resin pattern is first etched away with oxygen plasma ashing to remove the polymer on the fluoridated surface, then chemical treatment is generally carried out using an organic stripper, such as stripper 106 manufactured by Tokyo Ohka Kogyo or the like, though when the intermediate conductive layer 36A is reduced to expose the base aluminum layer 35A, an Al2O3 insulator is formed on the surface of the aluminum layer 35A with oxygen plasma ashing treatment, losing good ohmic contact with the pixel electrode 22. This problem may be avoided by setting the film thickness to 0.2 µm, for example, so the intermediate conductive layer 36A may be reduced. Alternately, an avoidance measure is possible wherein the aluminum layer 35A is removed when forming the openings 62 to 65 to expose the Ti thin film layer 34A which is the base heat-resistant metal layer and then form the pixel electrode 22. This measure has the advantage that the intermediate conductive layer 36A is not required from the beginning.

Still, with the former measure, if the uniformity in the thickness of these thin film surfaces is unfavorable, this approach may not necessarily act effectively either, and this applies identically to cases where the surface uniformity in the etch rate is also unfavorable. With the latter measure, the intermediate conductive layer 36A is unneeded, but a removal process for the aluminum layer 35A is added, and there is the danger that the pixel electrode 22 may be cut off if the cross-section control of the opening 62 is inadequate.

Further, in the channel formation process applied in the four-mask process, the source and drain wire material between the source-drain wires 12 and 21 and the semiconductor layers including impurities are selectively removed, so this process determines the length of the channel (4 to 6 µm in products currently being mass produced) which greatly affects the "on" characteristics of the insulating gate-type transistor. Fluctuation in the channel length greatly alters the "on" current value of the insulating gate-type transistor, so strict manufacturing controls are ordinarily required, but the channel length, that is, the pattern dimensions of the half-tone exposure region, is greatly affected by many parameters such as the exposure value (light source strength and photomask pattern precision and particularly the line and space dimensions), coating thickness of the photosensitive resin, developing of the photosensitive resin, and the amount of reduction in the photosensitive resin in the etching process; in addition, stable production with a high yield is not necessarily possible while keeping uniformity in these quantities in the surface, and even stricter production control is required than that in conventional manufacturing, so it definitely cannot be said that the art is currently at a high level of completion. In particular, if the channel length is 6 µm or less, there is a significant tendency for the effects of the pattern dimensions occurred in conjunction with a decrease in the thickness of the resist pattern to be large. That is because when the photosensitive resin patterns 80A and 80B are anistropically reduced during the reduction of the photosensitive resin patterns 80A and 80B are 1.5 µm, the dimension between the photosensitive resin patterns 80A naturally grows 3 µm, so the channel is formed 3 µm longer than the set value.

The present invention takes into account the present state of the art, not only avoiding the defects in forming the contacts common to the conventional five-mask process and the four-mask process, but also decreasing the manufacturing processes used in half-tone exposure technology having a large manufacturing margin. The need to achieve lower-priced liquid crystal panels and earnestly pursue a further decrease in the number of manufacturing processes in response to increased demand is clear. The value of the present invention is thus further enhanced by its contribution of technology to simplify other major manufacturing processes and provide lower costs.

The liquid crystal display device recited in Claim 1 is characterized by the fact that in which liquid crystal is filled between a first transparent insulating substrate (active substrate) in which unit pixels having at least an insulating gate transistor, a scan line doubling as a gate electrode and a signal line doubling as a source wire of the said insulating gate transistor, and a pixel electrode connected to a drain wire on a main surface are arranged in a two-dimensional matrix and a second transparent insulating substrate or a color filter opposing the first transparent insulating substrate characterized by the fact that at least:

source wires doubling as signal lines and drain wires doubling as pseudo-pixel electrodes, comprising a laminate made of a transparent conductive layer and a low-resistance metal layer, are connected to the first semiconductor layers not including impurities forming channels via second semiconductor layers including impurities and heat-resistant metal layers, and the low-resistant metal layers of the pseudo-pixel electrodes in the openings formed in a passivation insulating layer on the first transparent insulating substrate are removed to expose transparent conductive pixel electrodes.

This construction, which ensures an electrical connection between the source and drain for the insulating gate-type transistor and the transparent conductive layer via the heat-resistant metal layer, is obtained by forming the source wire doubling as the signal line and the drain electrode doubling as the pseudo-pixel electrode, comprising a laminate made of a transparent conductive layer and a low resistance metal layer, and removing the low resistance metal layer in addition to the passivation insulating layer above the pseudo-pixel electrode in the process for forming an opening in the passivation insulating layer. The process is thereby streamlined with the same photomask used for the pixel electrode formation process and the signal line formation process.

A variety of embodiments for liquid crystal display devices can be constructed by combining streamlining of the contact formation process and technologies for handling the contact formation process and the semiconductor layer formation process, to further decrease the number of processes, the scan line formation process and the contact formation process or the scan line formation process and the semiconductor layer formation process with the same photomask using half-tone exposure technology; these are described in detail in Claim 2 to Claim 7.

The liquid crystal display device recited in Claim 2 is characterized by the fact that in a liquid crystal display device in which liquid crystal is filled between a first transparent insulating substrate (active substrate) and a color filter or a second transparent insulating substrate opposing the said first transparent insulating substrate, wherein at the least:

scan lines comprising a metal layer of one or more layers are formed on a main surface of the first transparent insulating substrate, first semiconductor layers not including impurities are formed in island shapes wider than gate electrodes through a gate insulating layer of one or more layers above the gate electrodes, a pair of source-drain electrodes comprising a laminate of a second semiconductor layer including impurities and a heat-resistant metal layer are formed to overlap the gate electrodes on the first semiconductor layers, openings are formed in a gate insulating layer on the scan lines to expose part of the scan lines in the openings, outside an image display region, signal lines comprising a laminate made of a transparent conductive layer and a low-resistance metal layer are formed on the source electrodes and on the gate insulating layer, transparent conductive pixel electrodes are formed on the drain electrodes and on the gate insulating layer having low-resistance metal layers laminated in peripheries thereof, transparent conductive electrode terminals of the scan line are formed containing the said openings on the gate insulating layer, and transparent conductive electrode terminals of the signal line composing part of the signal lines are formed outside an image display region, and a passivation insulating layer having openings on the pixel electrodes and on the electrode terminals of the scan line and the signal lines are formed on the first transparent insulating substrate.

Through this construction, the transparent conductive pixel electrode is formed on the gate insulating layer at the same time as a signal line, but the passivation insulating layer is formed on the active substrate as in the prior art example to protect the channel and the source-drain wires of the insulating gate-type transistor. Also, electrode terminals for the scan line and the signal line are constructed with the transparent conductive layer similar to the pixel electrode. This is a structural feature common to the liquid crystal display devices of the present invention similar to there being a passivation insulating layer on the active substrate.

A liquid crystal display device recited in Claim 3, similar to that recited in Claim 2, is characterized by the fact that, at the least:

scan lines comprising a metal layer of one or more layers is formed on a main surface of the first transparent insulating substrate, laminates made of a gate insulating layer and a first semiconductor layer not including impurities are formed in island shapes on a gate electrode wider than the gate electrodes and also formed in island shapes wider than the scan lines proximate to the intersections of the scan lines and the signal lines, a pair of source-drain electrodes comprising a laminate of a second semiconductor layer including impurities and a heat-resistant metal layer are formed such as to overlap gate electrodes on the first semiconductor layers above the gate electrodes, and laminates made of a second semiconductor layer including impurities and a heat-resistant metal layer are formed in island shapes on the first semiconductor layers at the intersections of the scan lines and the signal lines, signal lines comprising a laminate made of a transparent conductive layer and a low-resistance metal layer are formed on the source electrodes, on the first transparent insulating substrate, and on the heat-resistant metal layers above the intersections of the scan lines and the signal lines, transparent conductive pixel electrodes are formed on the drain electrode and on the first transparent insulating substrate having low-resistance metal layers laminated in the peripheries thereof, transparent conductive electrode terminals of the scan line are formed containing part of the scan lines on the first transparent insulating substrate outside an image display region, and transparent conductive electrode terminals of the signal lines composing part of the signal line are formed outside an image display region, and a passivation insulating layer having openings on the pixel electrodes and on electrode terminals of the scan lines and the signal lines is formed on the first transparent insulating substrate.

Through this construction, the electrodes are exposed on the glass substrate 2 except for part of the scan line and the greater part of the storage capacitor line during the manufacturing process, but at the end, they are protected similar to the channel and the source-drain wires for the insulating gate-type transistor through the passivation insulating layer formed as done conventionally on the active substrate. The transparent conductive pixel electrode is formed at the same time as the signal line, so it is formed on the glass substrate.

A liquid crystal display device recited in Claim 4, similar to that recited in Claim 2, is characterized by the fact that, at the least:

scan lines comprising a metal layer of one or more layers with insulating layers on their sides are formed on a main surface of the first transparent insulating substrate, gate insulating layers of one or more layers are formed on the scan lines, first semiconductor layers not including impurities are formed in island shapes on the gate insulating layers above the gate electrodes, a pair of source-drain electrodes comprising a laminate made of a second semiconductor layer including impurities and a heat-resistant metal layer are formed on the first semiconductor layers, openings are formed in the gate insulating layers on the scan lines to expose part of the scan lines in the openings outside an image display region, signal lines comprising a laminate made of a transparent conductive layer and a low-resistance metal layer are formed on the source electrodes and on the first transparent insulating substrate, transparent conductive pixel electrodes are formed on the drain electrodes and on the first transparent insulating substrate having low-resistance metal layers laminated in the peripheries thereof, transparent conductive electrode terminals of the scan lines are formed on the openings and on laminates made of the first semiconductor layer, the second semiconductor layer, and the heat-resistant metal layer at peripheries of the openings, and transparent conductive electrode terminals of the signal lines are formed composing part of the signal lines outside an image display region, and a passivation insulating layer having openings on the pixel electrodes and on the electrode terminals of the scan lines and the signal lines is formed on the said first transparent insulating substrate.

Through this construction, the contact is formed for the scan line self-conforming thereto, and a gate insulating layer is formed whose pattern width is identical to that of the gate electrode, so an insulating layer different from the gate insulating layer is provided on the sides of the gate electrode (scan line) making it possible for the scan line and signal line to cross. The transparent conductive pixel electrode is formed at the same time as the signal line, so it is formed on the glass substrate.

A liquid crystal display device recited in Claim 5, similar to that recited in Claim 2, is characterized by the fact that, at the least:

scan lines comprising a metal layer of one or more layers with insulating layers on their sides are formed on a main surface of the first transparent insulating substrate, gate insulating layers of one or more layers are formed on the scan lines, first semiconductor layers not including impurities are formed in island shapes on the gate insulating layers above the gate electrodes, a pair of source-drain electrodes comprising a laminate made of a second semiconductor layer including impurities and a heat-resistant metal layer are formed on the said first semiconductor layers, openings are formed in the gate insulating layers on the scan lines to expose part of the scan lines in the openings outside an image display region, signal lines comprising a laminate made of a transparent conductive layer and a low-resistance metal layer are formed on the source electrodes and on the first transparent insulating substrate, transparent conductive pixel electrodes are formed on the drain electrodes and on the first transparent insulating substrate having low-resistance metal layers in peripheries thereof, transparent conductive electrode terminal of the scan line are formed containing the openings, and transparent conductive electrode terminals of the signal line is formed composing part of the signals line outside an image display region, and a passivation insulating layer having openings on the pixel electrodes and on the electrode terminals of the scan line and the signal lines are formed on the first transparent insulating substrate.

Through this construction, the semiconductor layer is formed self-conforming to the scan line, and the gate insulating layer is formed whose pattern width is identical to that of the gate electrode, so an insulating layer different from the gate insulating layer is provided in the sides of the gate electrode (scan line) making it possible for the scan line and signal line to cross. The transparent conductive pixel electrode is formed at the same time as the signal line, so it is formed on the glass substrate.

al display device recited in Claim 6 is, similar to that recited in Claim 2, characterized by the fact that, at the least:

scan lines comprising a metal layer of one or more layers with insulating layers on their sides are formed on a main surface of the first transparent insulating substrate, gate insulating layers of one or more layers are formed on the scan lines, first semiconductor layers not including impurities are formed in island shapes slightly smaller than the gate insulating layers on the gate insulating layers above the gate electrodes, a pair of source-drain electrodes comprising a laminate made of a second semiconductor layer including impurities and a heat-resistant metal layer are formed on the first semiconductor layers, openings are formed in the gate insulating layers on the scan lines to expose part of the scan lines in the openings outside an image display region, signal lines comprising a laminate made of a transparent conductive layer and a low-resistance metal layer are formed on the source electrodes and on the first transparent insulating substrate, transparent conductive pixel electrodes are formed on the drain electrodes and on the first transparent insulating layer having low-resistance metal layers in peripheries thereof, transparent conductive electrode terminals of the scan lines are formed containing the openings, and transparent conductive electrode terminals of the signal lines composing part of the signal lines are formed outside an image display region, a passivation insulating layer having openings on the pixel electrodes and on the electrode terminals of the scan lines and the signal line is formed on the said first transparent insulating substrate.

Through this construction, the semiconductor layer is made slightly narrower than the gate electrode above the gate electrode, and the gate insulating layer is formed with the same width as the gate electrode, so an insulating layer different from the gate insulating layer is provided on the sides of the gate electrode (scan line) making it possible for the scan line and signal line to cross. The transparent conductive pixel electrode is formed at the same time as the signal line, so it is formed on the glass substrate.

A liquid crystal display device recited in Claim 7 is, similar to that recited in Claim 2, characterized by the fact that, at the least:

scan line comprising a metal layer of one or more layers with insulating layers on their sides are formed on a main surface of the first transparent insulating substrate, laminates made of a gate insulating layer and a first semiconductor layer not including impurities are formed in island shapes above the gate electrodes and also formed in island shapes on the scan lines proximate to intersections of the signal lines and the scan lines, a pair of source-drain electrodes comprising a laminate made of a second semiconductor layer including impurities and a heat-resistant metal layer are formed on the first semiconductor layers above the gate electrodes, and laminates made of a second semiconductor layer including impurities and a heat-resistant metal layer are formed on the first semiconductor layers at intersections of the scan lines and the signal lines, signal lines comprising a laminate made of a transparent conductive layer and a low-resistance metal layer are formed on the source electrodes, on the first transparent insulating substrate, and on the heat-resistant metal layers at the intersection of the scan lines and the signal lines, transparent conductive pixel electrodes are formed on the drain electrodes and on the first transparent insulating substrate having low-resistance metal layers in peripheries thereof, transparent conductive electrode terminals of the scan lines are formed containing part of the scan lines on a first transparent insulating substrate outside of an image display region, and transparent conductive electrode terminals of the signal lines composing part of the signal lines are formed outside an image display region, and a passivation insulating layer having openings on the said pixel electrodes and on the electrode terminals of the scan lines and the signal lines is formed on the said first transparent insulating substrate.

Through this construction, the semiconductor layer is formed self-conforming to the scan line, the gate insulating layer is formed whose pattern width is identical to that of the gate electrode (scan line) only above the scan line proximate to an intersection of the signal line and the scan line and above the gate electrode, and an insulating layer different from the gate insulating layer is provided on the sides of the gate electrode (scan line), making it possible for the scan line and the signal line to cross. The transparent conductive pixel electrode is formed at the same time as the signal line, so it is formed on the glass substrate.

The liquid crystal display device cited in Claim 8 is the liquid crystal display device recited in Claim 4, Claim 5, Claim 6, and Claim 7 characterized by the fact that insulating layers formed on the sides of the scan lines is organic insulating layers. Through this construction, an organic insulating layer can be formed by electro-deposition on the sides of the scan lines regardless of the material or construction of the scan line, and half-tone exposure technology is used to make it possible to repeatedly use one photomask for the scan line formation process and the contact or semiconductor layer formation process.

The liquid crystal display device recited in Claim 9 is the liquid crystal display device recited in Claim 4, Claim 5, Claim 6, and Claim 7 characterized by the fact that a first metal layer comprises an anodizable metal layer and that the insulating layers formed on the sides of the scan lines are an anodized layers. Through this construction, it is possible to form anodized layers through anodization on the sides of the scan lines, and half-tone exposure technology is used to make it possible to repeatedly use one photomask for the scan line formation process and the contact or semiconductor layer formation process.

Claim 10 is the manufacturing method for the liquid crystal display device recited in Claim 1, characterized by the fact of having:

in a liquid crystal display device made by filling liquid crystal between a first transparent insulating substrate (an active substrate) in which unit pixels having at least an insulating gate-type transistor, a signal line doubling as a source wire and a scan line doubling as a gate electrode of the said insulating gate-type transistor, and a pixel electrode connected to a drain wire are arranged in a two-dimensional matrix on a main surface and a second transparent insulating substrate or a color filter opposite the said first transparent insulating substrate, wherein at the least:

a process for forming semiconductor layers comprising a laminate made of a first semiconductor layer not including impurities, a second semiconductor layer including impurities, and a heat-resistant metal layer above a gate electrode through a gate insulating layer, a process for forming source wires for insulating gate-type transistors doubling as signal lines and drain wires doubling as pseudo-pixel electrodes, both comprising a laminate made of a transparent conductive layer and a low-resistance metal layer, and a process for forming openings on the said pseudo-pixel electrodes after a passivation insulating layer is deposited, and for removing the passivation insulating layer and the low-resistance metal layer to expose transparent conductive pixel electrodes.

Through this construction, it is possible to decrease the number of manufacturing processes for forming source wires (signal lines) for insulating gate-type transistors comprising a laminate made of a transparent conductive layer and a low-resistance metal layer, and forming a pixel electrode comprising a transparent conductive layer using one photomask.

In addition to a process for forming source wires (signal lines) for insulating gate-type transistors comprising a laminate made of a transparent conductive layer and a low-resistance metal layer and forming a pixel electrode comprising a transparent conductive layer, a scan line formation process, a semiconductor layer formation process, and a contact formation process are required in order to produce a liquid crystal display device. By combining the streamlining of the contact formation process to decrease the number of processes and technology where half-tone exposure technology is employed to use the same photomask for the contact formation process and the semiconductor layer formation process, or the scan line formation process and the contact formation process, or the scan line formation process and the semiconductor layer formation process, a variety of manufacturing methods can be constructed for liquid crystal display devices. These are described in detail in Claim 11 to Claim 17.

Claim 11 is a manufacturing method for the liquid crystal display device recited in claim 2 characterized by the fact of having a process for forming scan lines, a process for forming semiconductor layers in which heat-resistant metal layers are laminated, a process for forming contacts, a process for forming pseudo-pixel electrodes, signal lines and pseudo-electrode terminals of the scan lines and the signal lines, all comprising a laminate made of a transparent conductive layer and a low-resistance metal layer, and a process for forming openings on the pseudo-pixel electrodes and on pseudo-electrode terminals after depositing a passivation insulating layer, and then for removing the passivation insulating layer and the low-resistance metal layer in the openings.

Through this construction, the manufacturing processes for forming pixel electrodes and signal lines with one photomask are reduced, making it possible to manufacture a TN-type liquid crystal display device using five photomasks.

Claim 12 is also a manufacturing method for the liquid crystal display device recited in Claim 2 characterized by the fact of having a process for forming scan lines, a process for forming contacts and semiconductor layers in which heat-resistant metal layers are laminated with half-tone exposure technology using one photomask, a process for forming pseudo-pixel electrodes, signal lines and pseudo-electrode terminals of the scan lines and the signal lines, all comprising a laminate made of a transparent conductive layer and a low-resistance metal layer, and a process for forming openings on the said pseudo-pixel electrodes and on pseudo-electrode terminals after depositing a passivation insulating layer, and then for removing the passivation insulating layer and the low-resistance metal layer in the openings.

Through this construction, the number of manufacturing processes for forming pixel electrodes and signal lines with one photomask is reduced, and the number of manufacturing processes for forming contacts and semiconductor layers with one photomask is reduced at the same time, making it possible to manufacture a TN-type liquid crystal display device using four photomasks.

Claim 13 is a manufacturing method for the liquid crystal display device recited in Claim 3 characterized by the fact of having a process for forming scan lines, a process for exposing scan lines in which heat-resistant metal layers are laminated when forming semiconductor layers, a process for forming pseudo-pixel electrodes, signal lines, and pseudo-electrode terminals for the scan lines and the signal lines, all comprising a laminate made of a transparent conductive layer and a low-resistance metal layer, and a process for forming openings on the pseudo-pixel electrodes and on the pseudo-electrode terminals after depositing a passivation insulating layer, and then for removing the passivation insulating layer and the low-resistance metal layer in the openings.

Through this construction, the number of manufacturing processes for forming pixel electrodes and signal lines with one photomask is reduced, and the number of manufacturing processes for streamlining the formation of contacts by exposing scan lines during the formation of the semiconductor layers is reduced, making it possible to manufacture a TN-type liquid crystal display device using four photomasks.

Claim 14 is a manufacturing method for the liquid crystal display device recited in Claim 4 characterized by the fact of having a process for forming scan lines and contacts with half-tone exposure technology using one photomask, a process for forming semiconductor layers in which heat-resistant metal layers are laminated, a process for forming pseudo-pixel electrodes, signal lines, and pseudo-electrode terminals for the scan lines and the signal lines, all comprising a laminate made of a transparent conductive layer and a low-resistance metal layer, and a process for forming openings on the pseudo-pixel electrode and on the pseudo-electrode terminals after depositing a passivation insulating layer and then for removing the passivation insulating layer and the low-resistance metal layer in the openings.

Through this construction, the number of manufacturing processes for forming pixel electrodes and signal lines with one photomask is decreased, and the number of manufacturing processes for forming scan lines and contacts with one photomask is reduced at the same time, making it possible to manufacture a TN-type liquid crystal display device using four photomasks.

Claim 15 is a manufacturing method for the liquid crystal display device recited in Claim 5 characterized by the fact of having a process for forming scan lines and semiconductor layers in which heat-resistant metal layers are laminated with half-tone exposure technology using one photomask, a process for forming contacts, a process for forming pseudo-pixel electrodes, signal lines, and pseudo-electrode terminals for the scan lines and the signal lines, all comprising a laminate made of a transparent conductive layer and a low-resistant metal layer, and a process for forming openings on the pseudo-pixel electrodes and on the pseudo-electrode terminals after depositing a passivation insulating layer, and then for removing the passivation insulating layer and the low-resistance metal layer in the openings.

Through this construction, the number of manufacturing processes for forming pixel electrodes and signal lines with one photomask is reduced, and the number of manufacturing processes for forming scan lines and semiconductor layers using one photomask is reduced at the same time, making it possible to manufacture a TN-type liquid crystal display device using four photomasks.

Claim 16 is a manufacturing method for the liquid crystal display device recited in Claim 6 characterized by the fact of having a process for forming semiconductor layers in which heat-resistant layers are laminated, a process for forming scan lines and contacts with half-tone exposure technology using one photomask, a process for forming pseudo-pixel electrodes, signal lines, and pseudo-electrode terminals for the scan lines and the signal lines, all comprising a laminate made of a transparent conductive layer and a low-resistant metal layer, and a process for forming openings on the pseudo-pixel electrodes and on the pseudo-electrode terminals after depositing a passivation insulating layer, and then for removing the passivation insulating layer and the low-resistance metal layer in the openings.

Through this construction, the number of manufacturing processes for forming pixel electrodes and signal lines with one photomask is decreased, and the number of manufacturing processes for forming scan lines and contacts with one photomask is reduced at the same time, making it possible to manufacture a TN-type liquid crystal display device using four photomasks.

Claim 17 is a manufacturing method for the liquid crystal display device recited in Claim 7 characterized by the fact of having a process for forming scan lines and semiconductor layers in which heat-resistant metal layers are laminated with half-tone exposure technology using one photomask and for removing the gate insulating layer to expose the scan lines, a process for forming pseudo-pixel electrodes, signal lines, and pseudo-electrode terminals for the scan lines and the signal lines, all comprising a laminate made of a transparent conductive layer and a low-resistant metal layer, and a process for forming openings on the pseudo-pixel electrodes and on the pseudo-electrode terminals after depositing a passivation insulating layer, and then for removing the passivation insulating layer and the low-resistance metal layer in the openings.

Through this construction, the number of manufacturing processes for forming pixel electrodes and signal lines with one photomask is decreased, and the number of manufacturing processes is further reduced as the scan lines and the semiconductor layers are formed with one photomask and the scan lines are exposed, making the contact formation process unnecessary, so a TN-type liquid crystal display device can be manufactured using three photomasks.

A reduction in the number of processes while maintaining an electrical connection by interposing a heat-resistant metal layer between the source-drain for the insulating gate-type transistor and the transparent conductive layer, forming source lines doubling as signal lines and drain electrodes doubling as pseudo-pixel electrodes, comprising a laminate made of a transparent conductive layer and a low-resistant metal layer, and for removing the low-resistance metal layer in addition to the passivation insulating layer on the pseudo-pixel electrodes during the formation process of the openings in the passivation insulating layer to obtain transparent conductive pixel electrodes is a main theme of the present invention, and the structural feature of the electrode terminals of the scan line and the signal line being constructed with a transparent conductive layer similarly to the pixel electrode is thereby formed.

Further, with the combination of technology for streamlining the contact formation process for removing the gate insulating layer to expose the scan lines during formation of the semiconductor layers, technology for streamlining the formation of the contacts and semiconductor layers using one photomask with concomitant use of half-tone exposure technology, and technology for streamlining the formation of the scan lines and the contacts or the scan lines and the semiconductor layers with one photomask, it is possible to further decrease the number of photolithographic etching processes from the conventional five times to produce a liquid crystal display device using four or three photomasks, an extremely large industrial value from the perspective of decreasing costs for liquid crystal display devices. Moreover, the pattern accuracy in these processes is not so high, so controlling production without greatly affecting quality or yield is an easy matter.

As made clear in the above description, the requirements of the present invention are to maintain an electrical connection during the production of an active substrate by interposing a heat-resistance metal layer between the source-drain for an insulating gate-type transistor and a transparent conductive layer, and to selectively remove the low-resistance metal layer on pseudo-pixel electrodes during the formation of openings in a passivation insulating layer to form pixel electrodes after forming source wires doubling as signal lines and drain wires doubling as pseudo-pixel electrodes; comprising a laminate made of a transparent conductive layer and a low-resistant metal layer, and for construction other than that, the fact that a semiconductor device for the display device with a different film thickness or material such as the scan line or gate electrode layer, and differences in the manufacturing method thereof belong to the category of the present invention is self-evident, the usefulness of the present invention does not change for liquid crystal display devices using liquid crystal with vertically aligned liquid crystal, and the fact that the semiconductor layer for the insulating gate-type transistor is not limited to amorphous silicon is also clear.

DETAILED DESCRIPTION OF THE PREFERRED EMBODIMENT

Figure 1:
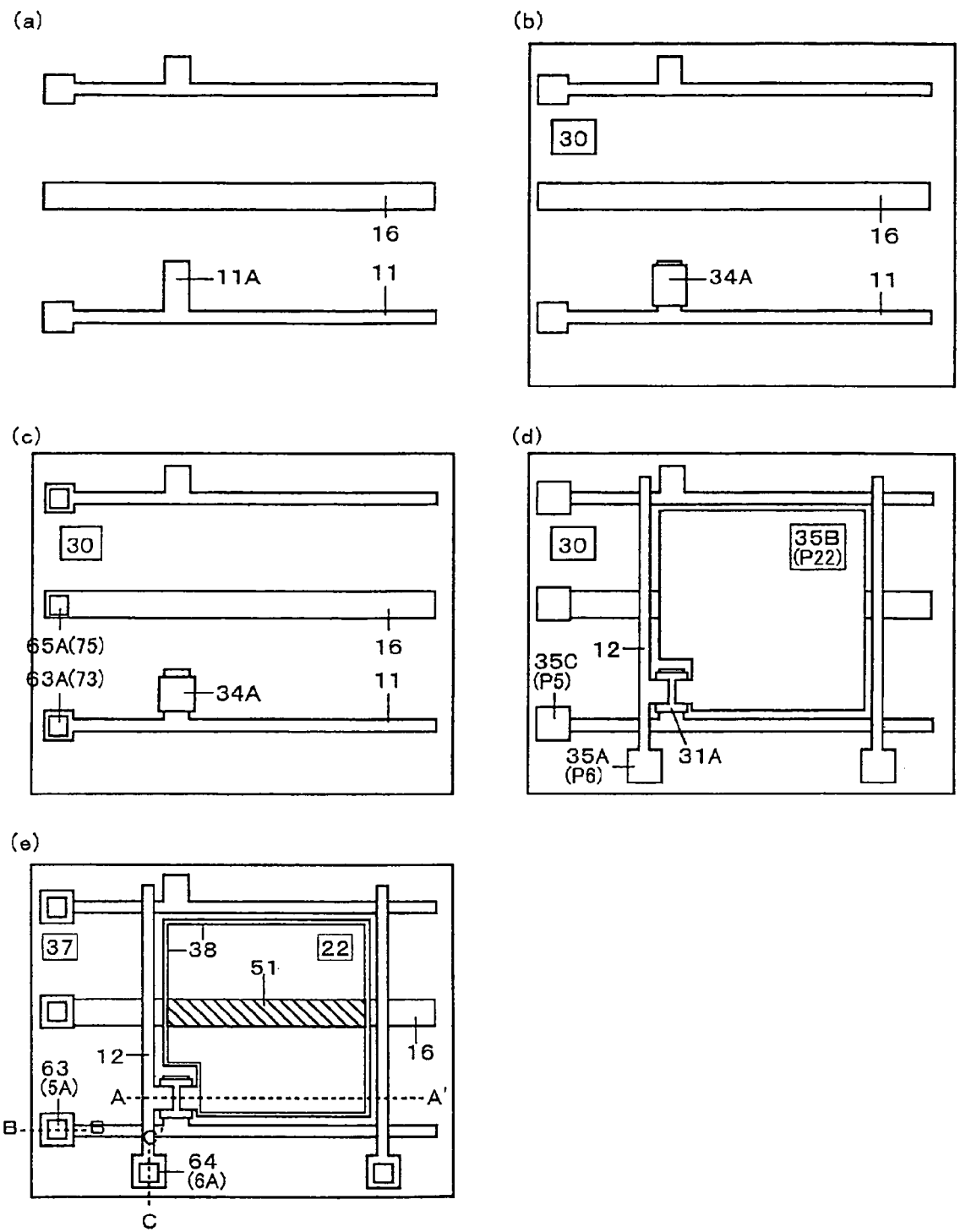
[FIG. 1] A plan view of a semiconductor device for the display device according to Embodiment 1 of the present invention.
Figure 2:
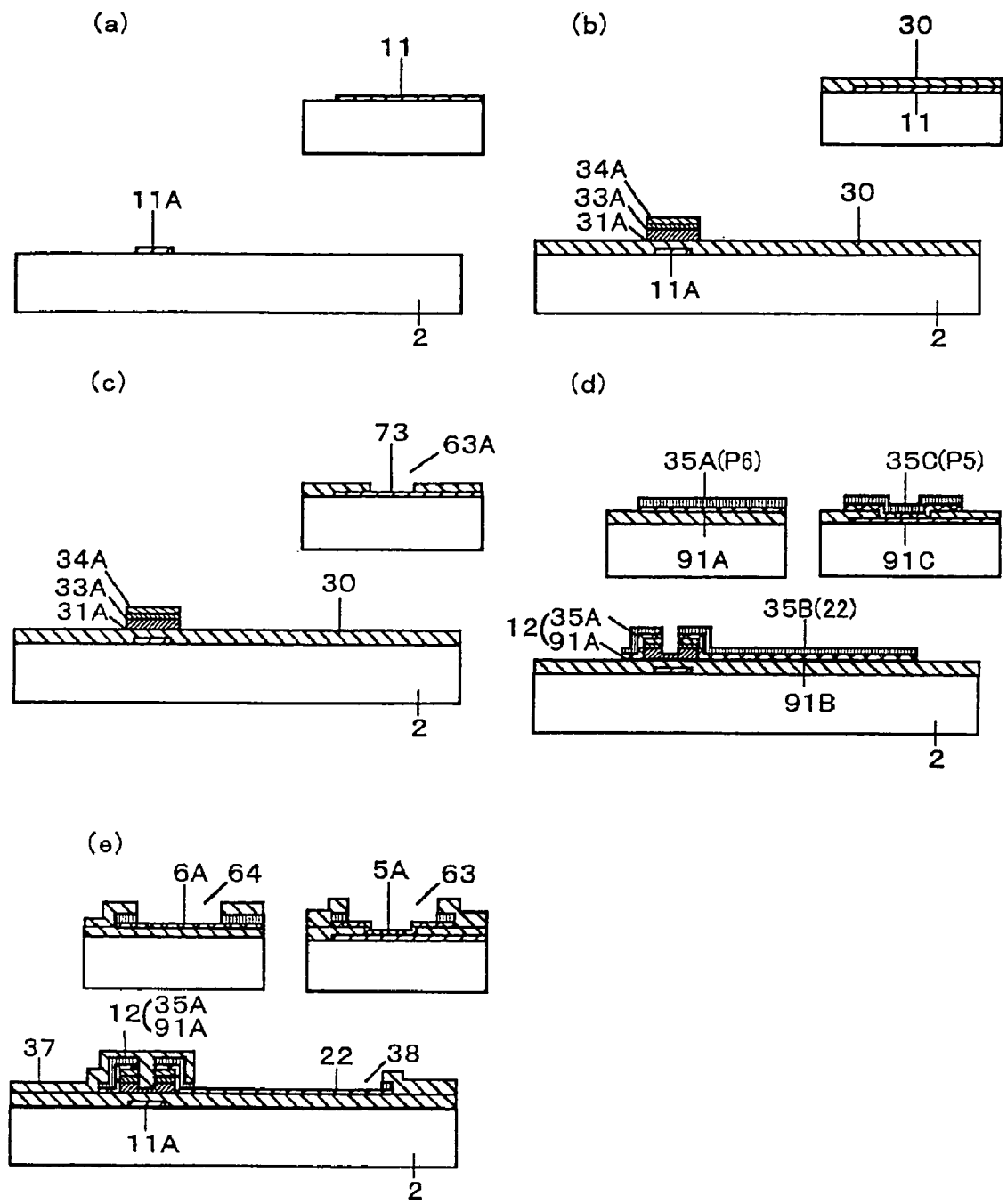
[FIG. 2] A cross-sectional view of the manufacturing process for a semiconductor device for the display device according to Embodiment 1 of the present invention
Figure 3:
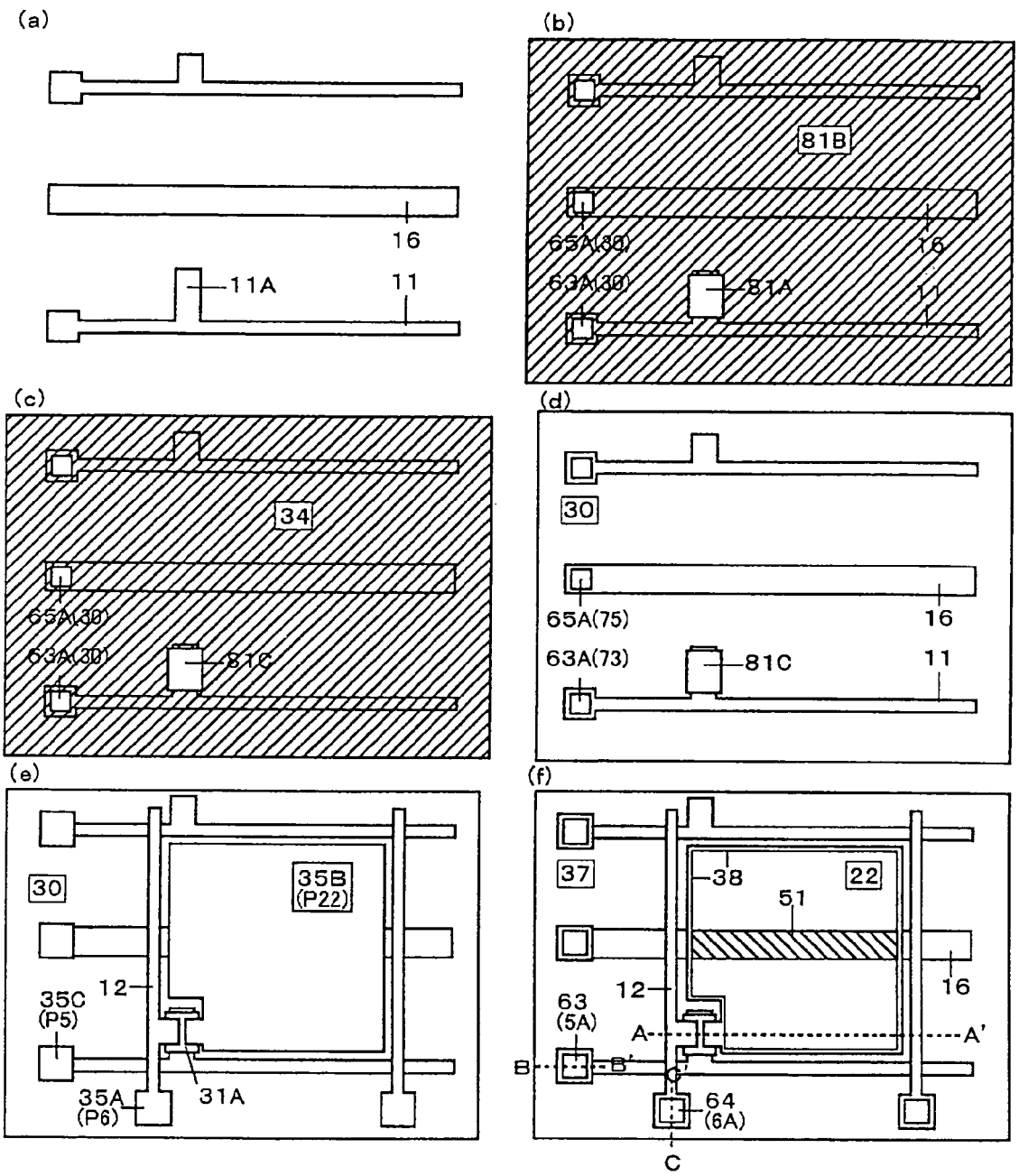
[FIG. 3] A plan view of a semiconductor device for the display device according to Embodiment 2 of the present invention
Figure 4:
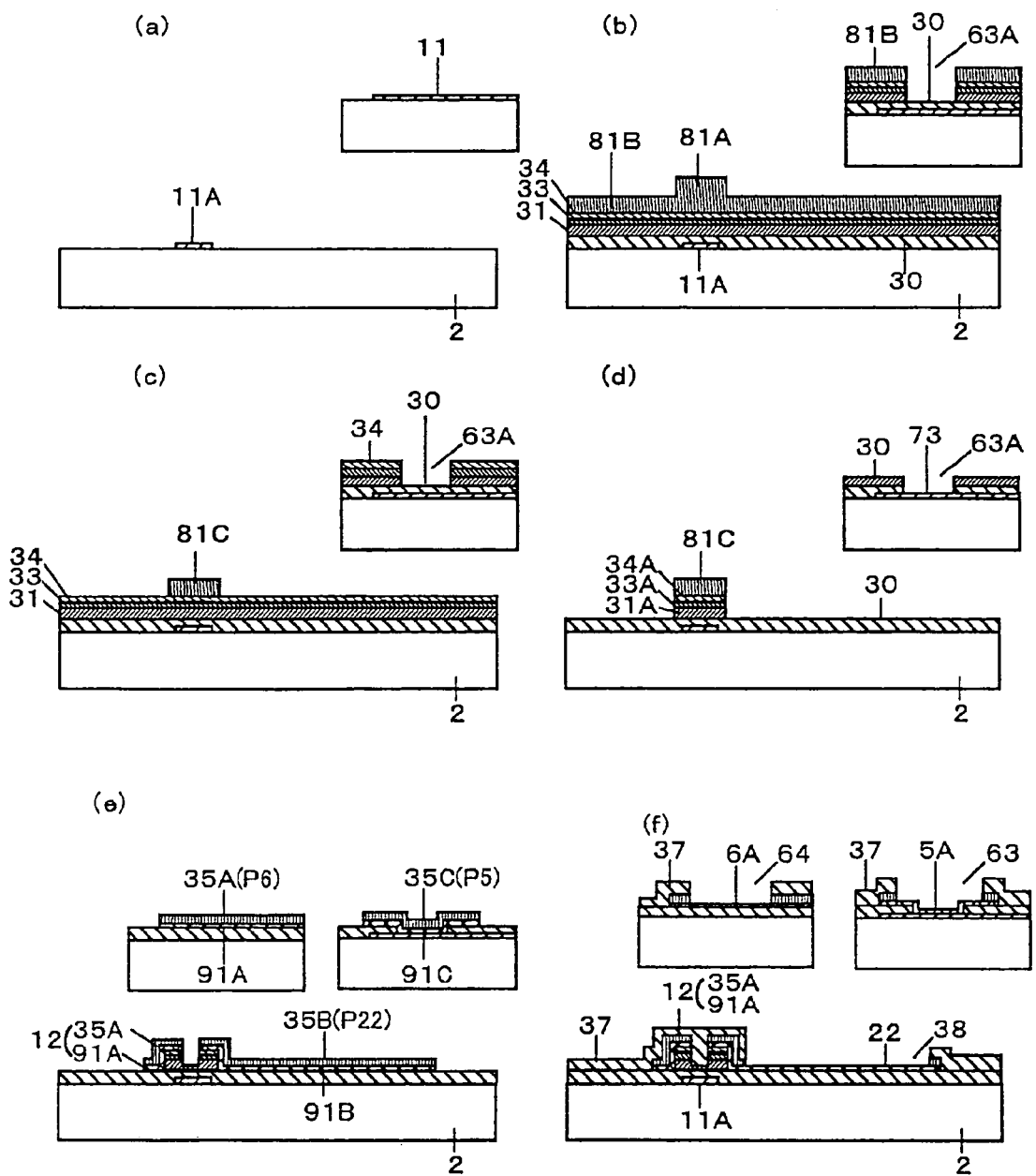
[FIG. 4] A cross-sectional view of the manufacturing process for a semiconductor device for the display device according to Embodiment 2 of the present invention
Figure 7:
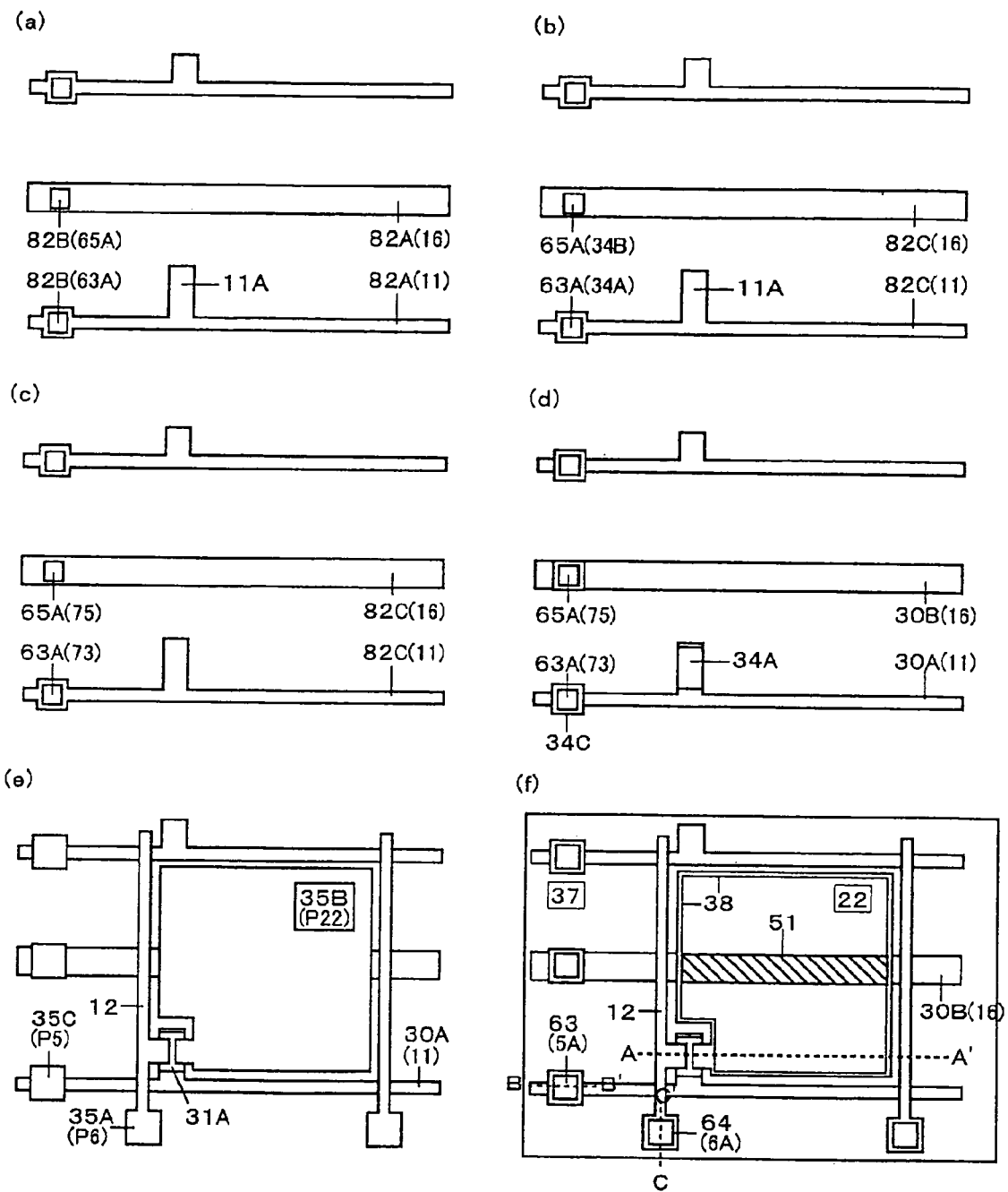
[FIG. 7] A plan view of a semiconductor device for the display device according to Embodiment 4 of the present invention
Figure 8:
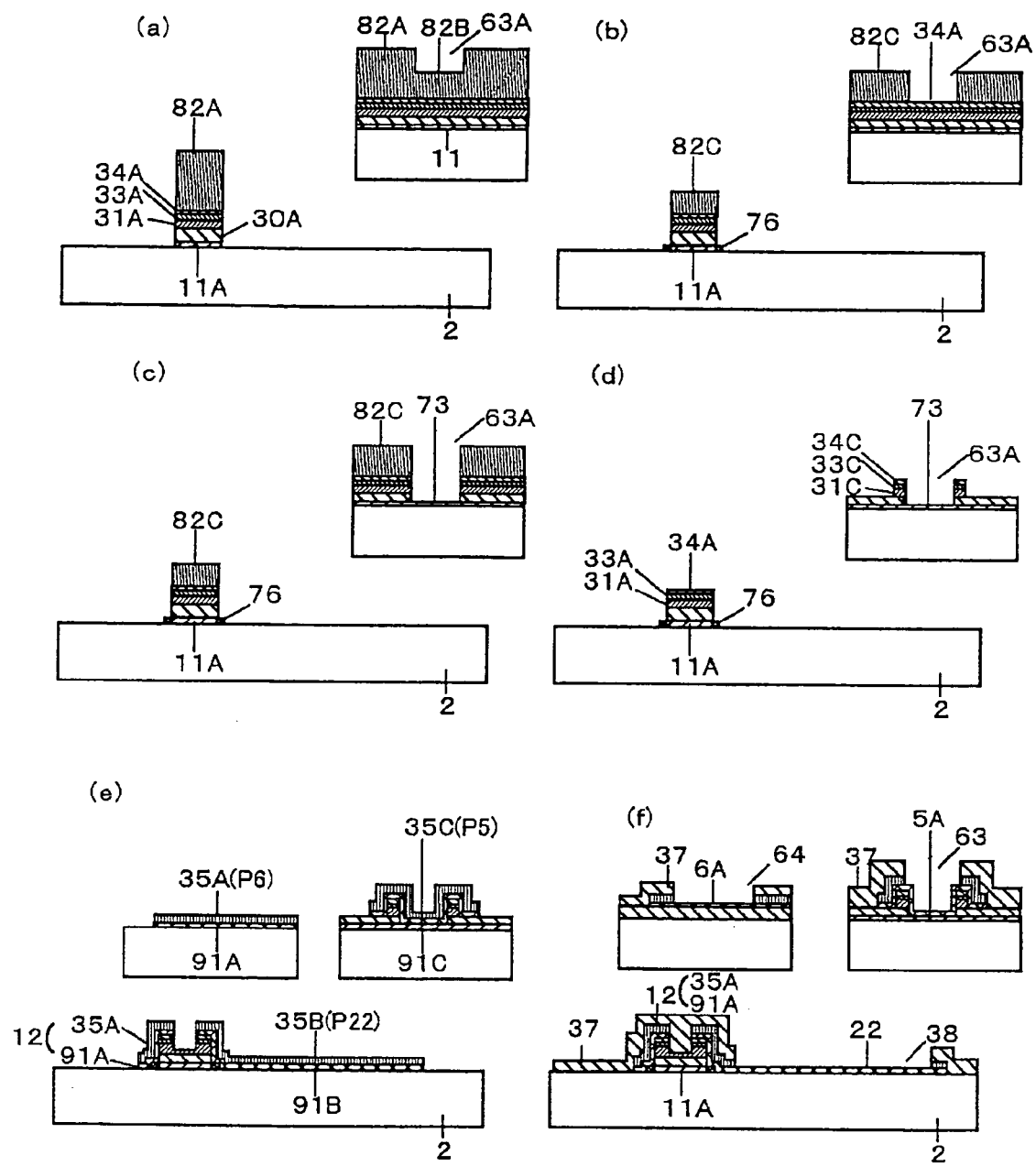
[FIG. 8] A cross-sectional view of the manufacturing process for a semiconductor device for the display device according to Embodiment 4 of the present invention
Figure 9:
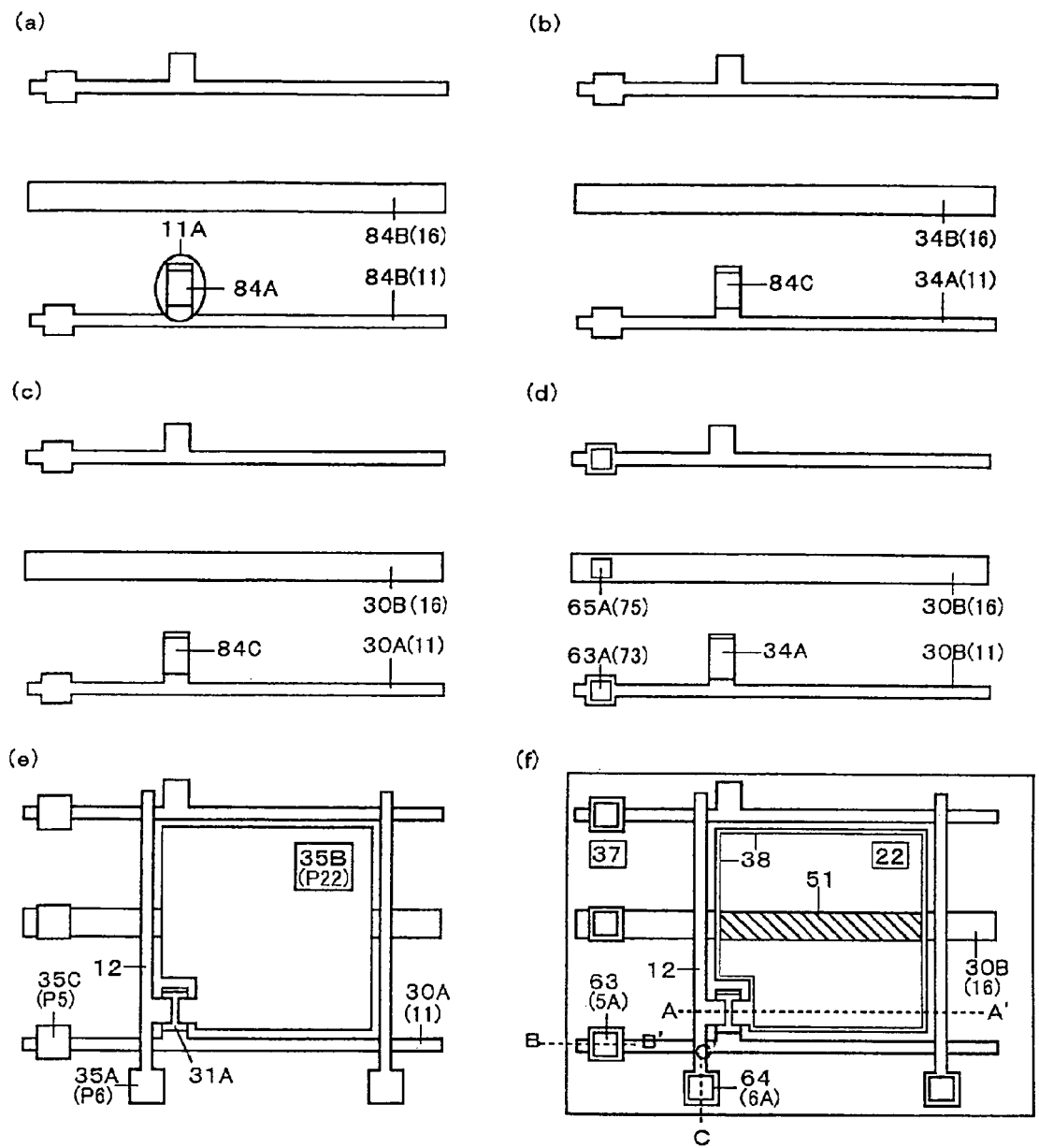
[FIG. 9] A plan view of a semiconductor device for the display device according to Embodiment 5 of the present invention
Figure 10:
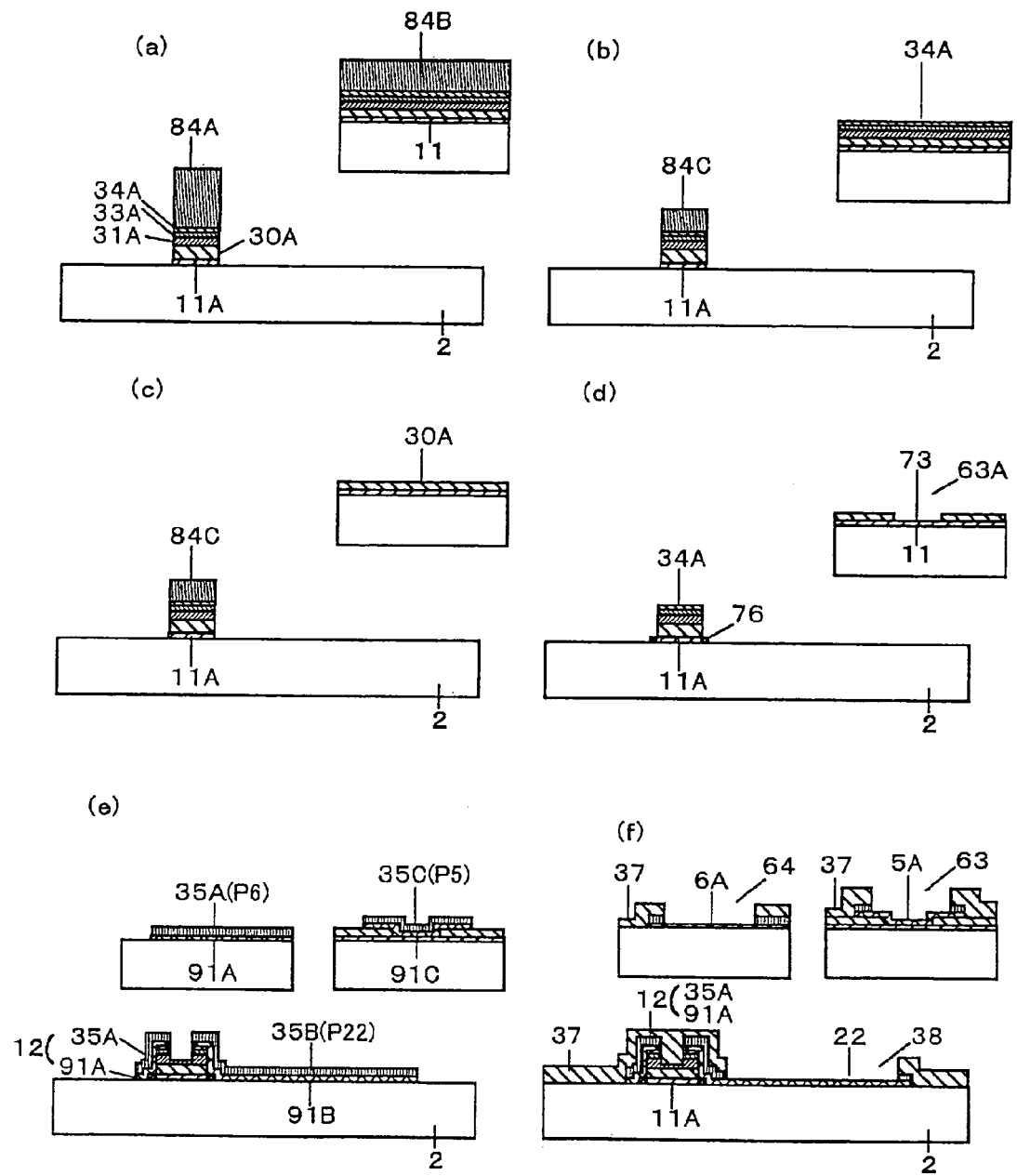
[FIG. 10] A cross-sectional view of the manufacturing process for a semiconductor device for the display device according to Embodiment 5 of the present invention
Figure 12:
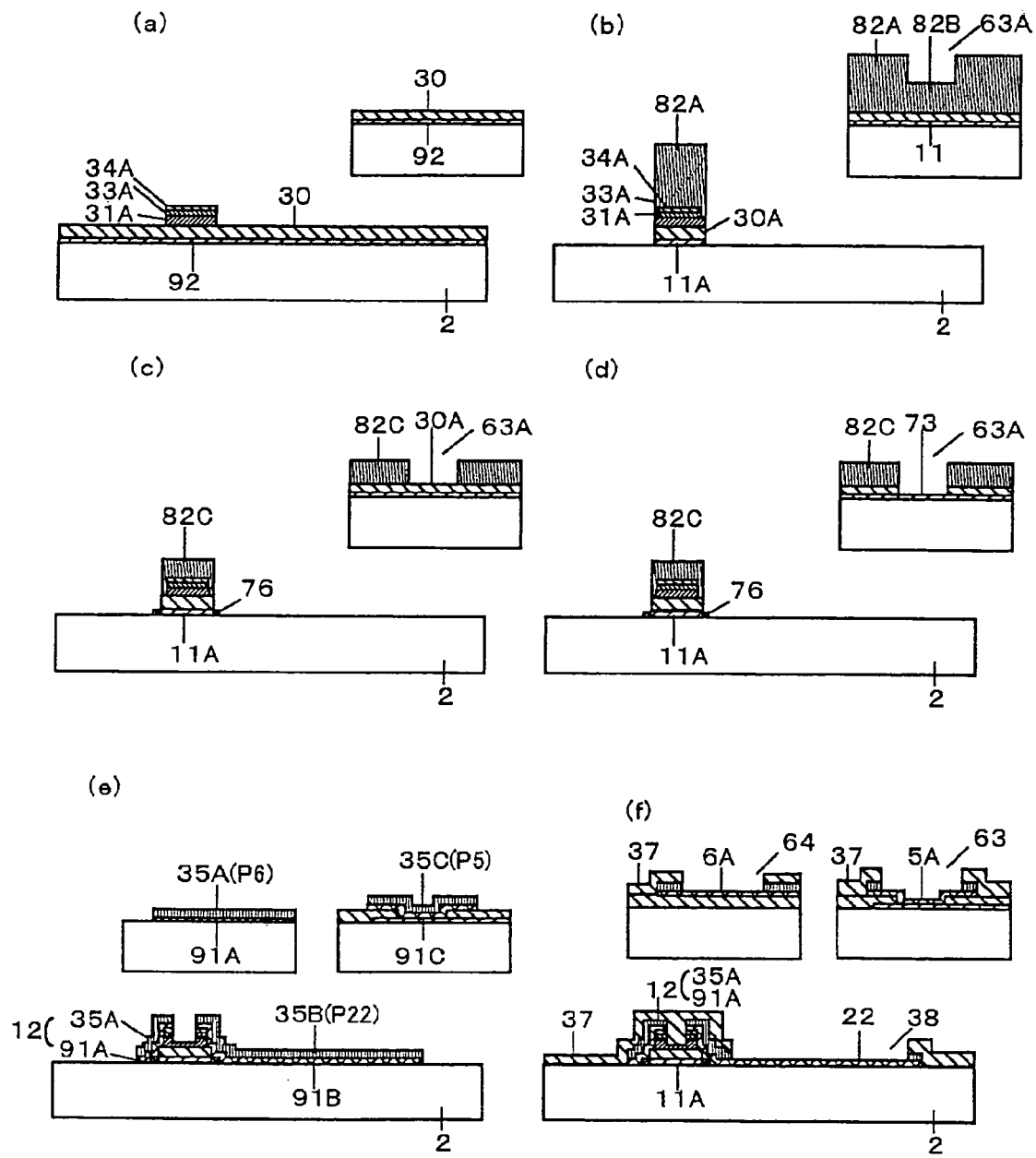
[FIG. 12] A cross-sectional view of the manufacturing process for a semiconductor device for the display device according to Embodiment 6 of the present invention
Figure 13:
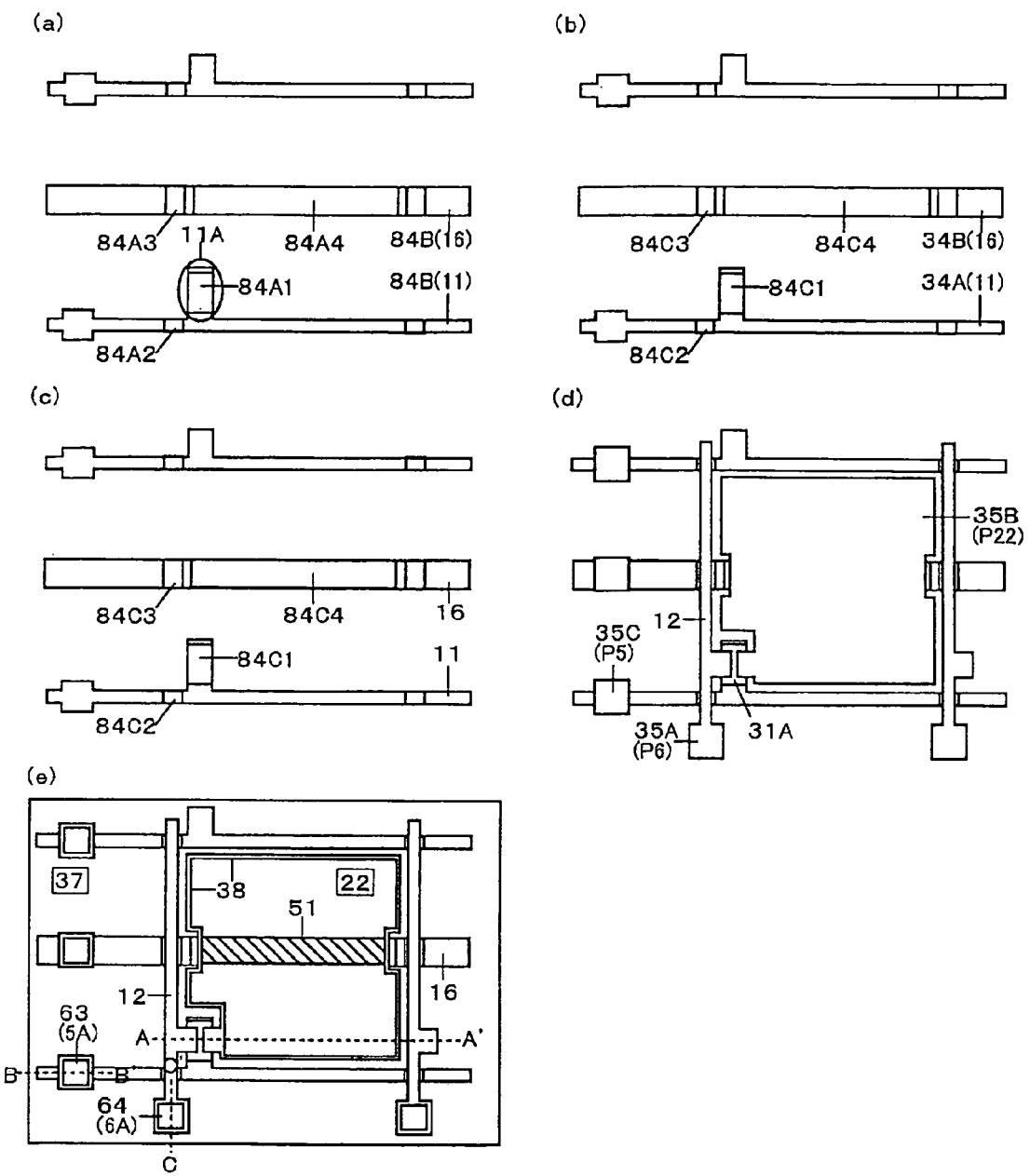
[FIG. 13] A plan view of a semiconductor device for the display device according to Embodiment 7 of the present invention
Figure 14:
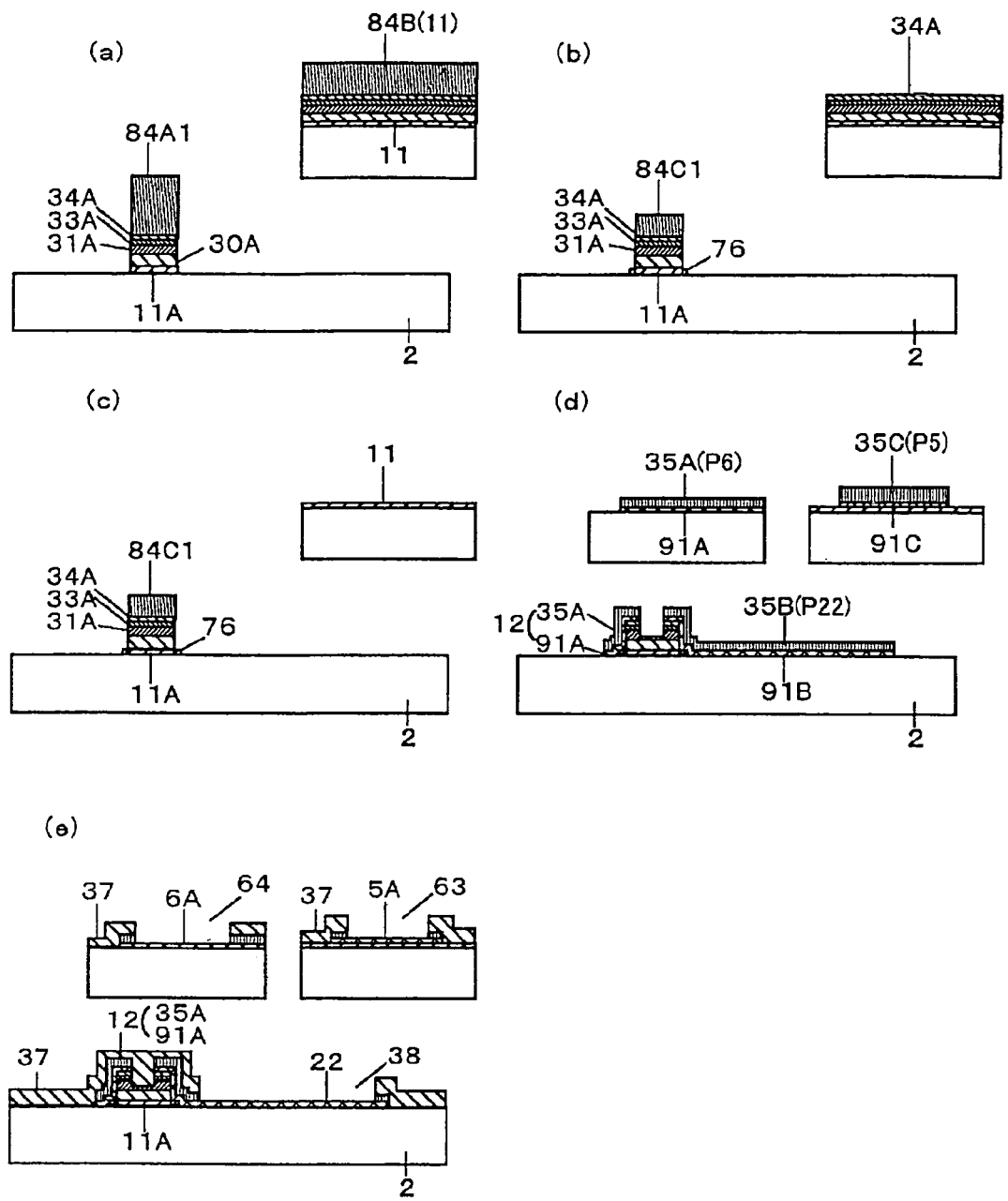
[FIG. 14] A cross-sectional view of the manufacturing process for a semiconductor device for the display device according to Embodiment 7 of the present invention

Embodiments of the invention are described below with reference to FIGS. 1 to 17. FIG. 1 shows plan views of a semiconductor device (active substrate) for a display device pertaining to a first embodiment of the present invention. FIG. 2 shows cross-sectional views of the manufacturing processes of lines A-A', B-B' and C-C' of FIG. 1. Similarly, FIG. 3 and FIG. 4 show plan views of an active substrate and cross-sectional views of a manufacturing process for Embodiment 2, and similarly so, FIG. 5 and FIG. 6 for Embodiment 3, FIG. 7 and FIG. 8 for Embodiment 4, FIG. 9 and FIG. 10 for Embodiment 5, FIG. 11 and FIG. 12 for Embodiment 6, and FIG. 13 and FIG. 14 for Embodiment 7. The reference numerals used in one portion of the conventional example are used similarly in other examples, so a detailed description thereof is omitted.

Embodiment 1

In Embodiment 1, first, a heat-resistant metal layer of, for example, Cr, Ta, Mo, or the like, or an alloy or a silicide thereof, is deposited about 0.1 to 0.3 μm thick on the main surface of a glass substrate 2 using an SPT or other vacuum film-depositing equipment. It goes without saying that a laminate made of Al or an Al alloy and these highly heat-resistant metals may be used if required to lower resistance. Then, scan lines 11 doubling as a gate electrode 11A and storage capacitor lines 16 are selectively formed using micro-fabrication technology as shown in FIG. 1(a) and FIG. 2(a). If a storage capacitor 15 is constructed between the pixel electrode (drain electrode) and the scan line in the upper pixel, the storage capacitor line 16 is not a requisite component.

Next, three thin film layers comprising a first SiNx layer 30 composing a gate insulating layer, a first amorphous silicon layer 31 composing a channel for an insulating gate-type transistor including hardly any impurities, and a second amorphous silicon layer 33 composing a source and drain of an insulating gate-type transistor including phosphorous, for example, as an impurity, are successively deposited about 0.3, 0.2, and 0.05 μm thick, for example, over the entire surface of the glass substrate 2 using a PCVD equipment. Then a thin film layer 34 comprising a heat-resistant metal of, for example, Ti, Cr, Mo, or the like, or a silicide thereof is deposited as a heat-resistant metal layer about 0.1-μm thick using an SPT or other vacuum film-depositing equipment, and semiconductor layer regions comprising a laminate made of a heat-resistant metal layer 34A, a second amorphous silicon layer 33A and a first amorphous silicon layer 31A are selectively formed wider than the gate electrodes 11A above the gate electrodes 11 to expose the gate insulating layer 30 using micro-fabrication technology as shown in FIG. 1(b) and FIG. 2(b).

Continuing, openings 63A and 65A are formed on the scan line 11 and on the storage capacitor line 16 outside the image display region using micro-fabrication technology, and the gate insulating layer 30 is selectively etched in the said openings 63A and 65A to expose part 73 of the scan line 11 and part 75 of the storage capacitor line 16 as shown in FIG. 1(c) and FIG. 2(c).

IZO, ITO, for example, or a mixture thereof is deposited as a transparent conductive layer about 0.1 to 0.2 μm thick using an SPT or other vacuum film-depositing equipment over the entire surface of the glass substrate 2. After subsequently depositing an Al or Al (Nd) alloy thin film layer 35 about 0.3 μm thick as a low resistance metal layer, the Al or Al (Nd) alloy thin film layer 35, the transparent conductive layer 91, the heat-resistant metal layer 34, and the second amorphous silicon layer 33 are etched using micro-fabrication technology to remove them. The first amorphous silicon layer 31 is etched, leaving about 0.05 to 0.1 μm, whereby a signal lines 12 doubling as source wires comprising a laminate made of the low resistance metal layer 35A and the transparent conductive layer 91A, and drain electrodes 21 of insulating gate-type transistors doubling as pseudo-pixel electrodes P22 comprising a laminate made of the low resistance metal layer 35B and the transparent conductive layer 91B are selectively formed such as to partially overlap with the gate electrodes 11A as shown in FIG. 1(d) and FIG. 2(d), and pseudo-electrode terminals P6 composing part of the signal lines 12 and pseudo-electrode terminals P5 of the scan lines are formed containing part 73 of the scan lines exposed in the openings 63A at the same time as the formation of the source-drain wires 12 and 21. Similarly, pseudo-electrode terminals of the storage capacitor lines 16 are also formed, though a reference number is not provided, containing part 75 of the storage capacitor lines 16. The description thereof is omitted below. In this manner, the heat-resistant metal layers 34A are divided into a pair of electrodes 34A-1 and 34A-2 (neither of which is illustrated) in this process, and the signal lines 12 are formed containing the first electrodes 34A-1 while pseudo-electrode terminals P22 are formed containing the second electrodes 34A-2, thereby functioning as source electrodes and drain electrodes of the insulating gate-type transistors, respectively.

In the formation of the source-drain wires 12 and 21, it is possible to repeatedly etch the transparent conductive layer 91 with the phosphoric acid etching solution used in the etching of the Al or Al (Nd) alloy thin film layer 35 as a low resistance metal layer in the etching of the transparent conductive layer 91 comprising IZO, ITO or a mixture thereof, if an amorphous film quality with nearly no crystal is used, so the etching process is simplified and the cost is lowered.

There are fewer factors for fluctuation in the pattern width for forming the source-drain wires 12 and 21 of the present invention with the one exposure treatment and one etching treatment than for the source-drain wires 12 and 21 formed with one exposure treatment and two etching treatments as described in the streamlined prior art example, and the pattern precision of the dimension control of the source-drain wires 12 and 21 as well as pattern precision of the dimension control of the interval between the source 12 and drain wires 21, that is, the channel length measurements are easier to control than with conventional half-tone exposure technology.

After the formation of the source-drain wires 12 and 21, a second SiNx layer about 0.3 µm thick is deposited as a transparent insulating layer over the entire surface of the glass substrate 2 using a PCVD equipment to make a passivation insulating layer 37, openings 38, 63, and 64 are formed on the pseudo-pixel electrodes P22 and the pseudo-electrode terminals P5 and P6, respectively, as shown in FIG. 1(e) and FIG. 2(e), and the passivation insulating layer and the low resistance metal layers 35A to 35C in the openings are removed to expose the transparent conductive pixel electrodes 22 and the greater part of the transparent conductive electrode terminals 5A and 6A.

In the removal of the low resistance metal layers 35A to 35C comprising Al or Al (Nd), even if an amorphous film quality with nearly no crystal is used for the transparent conductive layer 91 comprising IZO, ITO or a mixture thereof as described above, crystallization of transparent conductive layers 91A to 91C comprising IZO, ITO or a mixture thereof is promoted by substrate heating of about 250° C. provided during the deposition of the passivation insulating layer 37, causing micro-crystallization or poly-crystallization, increasing the fineness of the film quality, and causing resistance to the phosphoric acid-based etching solution, so even if the low resistance metal layers 35A to 35C in the openings are removed with a phosphoric acid-based etching solution, the problem of thickness reduction for the transparent conductive pixel electrodes 22 and the transparent conductive electrode terminals 5A and 6A is avoided or suppressed.

The active substrate 2 thus obtained and the color filter 9 are attached together to form a liquid crystal panel, thereby completing Embodiment 1 of the present invention. A construction of a region 51 (a right-slanting oblique portion) on which the pixel electrode 22 and the storage capacitor line 16 are overlaid in a planar fashion via the gate insulating layer 30 exemplifies the storage capacitor 15, though the construction of the storage capacitor 15 is not limited thereto. The construction may also be made through an insulating layer containing a gate insulating layer 30 between the scan line in the upper pixel 11 and the pixel electrode 22. Though not illustrated, a static electricity countermeasure in the prior art example may be used where a transparent conductive layer pattern 40, for the static electricity countermeasure, is disposed at the outer periphery of the active substrate 2, and the transparent conductive layer pattern 40 is connected to the transparent conductive electrode terminals 5A and 6A, but a formation process of openings in the gate insulating layer 30 is provided, making other static electricity countermeasures easy.

In Embodiment 1, the number of processes is decreased by simultaneous formation of the pixel electrodes and the signal lines, but the number of photomasks required merely stops at five. Streamlining other main processes to lower costs further is a theme of the invention, and in the below embodiments, the innovation and inventiveness used to create a four-mask process and even a three-mask process by streamlining other major processes while maintaining the decrease in processes for simultaneously forming pixel electrodes and signal lines are described.

Embodiment 2

In Embodiment 2, first, a heat-resistant metal layer of, for example, Cr, Ta, Mo, or the like, or an alloy or silicide thereof is deposited as a first metal layer about 0.1 to 0.3 µm thick on the main surface of the glass substrate 2 using an SPT or other vacuum film-depositing equipment, and scan lines 11 doubling as gate electrodes 11A and storage capacitor lines 16 are selectively formed as shown in FIG. 3(a) and FIG. 4(a) as in Embodiment 1.

Next, three thin film layers comprising a first SiNx layer 30 composing a gate insulating layer, a first amorphous silicon layer 31 composing a channel for an insulating gate-type transistor including hardly any impurities, and a second amorphous silicon layer 33 composing source and drain of an insulating gate-type transistor including phosphorous, for example, as an impurity are successively deposited about 0.3, 0.2, and 0.05 µm thick, for example, over the entire surface of a glass substrate 2 using a PCVD equipment. After a thin film layer 34 comprising a heat-resistant metal layer of, for example, Cr, Ta, Mo, or the like, or an alloy or a silicide thereof is deposited as a heat-resistant metal layer about 0.1 µm thick using an SPT or other vacuum film-depositing equipment, photosensitive resin patterns 81A and 81B having openings (contact regions) 63A and 65A on the scan lines 11 and the storage capacitors 16 outside an image display region and thicker than the 2-µm thickness, for example, of regions 81A at the semiconductor layer formation regions of the insulating gate-type transistors, that is, above the gate electrodes 11A and the 1-µm thickness of the other regions 81B are formed using half-tone exposure technology. Then, the heat-resistant metal layer 34, the second amorphous silicon layer 33, and the first amorphous silicon layer 31 exposed in the openings 63A and 65A are successively etched using the photosensitive resin patterns 81A and 81B as masks as shown in FIG. 3(b) and FIG. 4(b), and the gate insulating layer 30 is exposed in the openings 63A and 65A.

Continuing, by reducing the said photosensitive resin patterns 81A and 81B by 1 μm or more using oxygen plasma or other ashing means, the photosensitive resin patterns 81B can be eliminated to expose the heat-resistant metal layer 34 and the reduced photosensitive resin patterns 81C left unchanged only above the gate electrodes 11A as shown in FIG. 3(c) and FIG. 4(c). The pattern width of the photosensitive resin pattern 81C, that is the island-shaped semiconductor layer, is the sum of the size of the gate electrode 11A and the mask alignment accuracy, so if the gate electrode 11A is 10 to 12 μm and the alignment accuracy is ±3 μm, this results in 16 to 18 μm, not strict for a dimension accuracy. If the resist pattern is isotropically reduced 1 μm during the conversion from the resist pattern 81A to 81C, however, not only does the dimension decrease 2 μm, but the mask alignment accuracy decreases 1 μm to ±2 μm during subsequent source and drain wire formation, with the effects of the latter more strict in terms of process than the former. Accordingly, it is desirable to increase the anisotropicity to control changes in the pattern dimension in the said oxygen plasma treatment. In further detail, RIE oxygen plasma treatment is desirable, and ICP or TCP oxygen plasma treatment having a high-density plasma source is even more desirable. Alternatively, measures such as providing for a process-based approach of designing the pattern dimensions of the resist patterns 81A larger beforehand, anticipating the amount of dimension change in the resist pattern, are desirable.

Continuing, the heat-resistant metal layer 34, the second amorphous silicon layer 33, and the first amorphous silicon layer 31 are selectively left wider than the gate electrodes 11A using the reduced photosensitive resin patterns 81C as masks to form island-shape 34A, 33A, and 31A, exposing the gate insulating layer 30 as shown in FIG. 3(d) and FIG. 4(d).

In this time, the state of etching of the openings 63A and 65A is as described below, and finally part 73 of the scan lines 11 and part 75 of the storage capacitor lines 16 are exposed, respectively, in the openings 63A and 65A. Dry etching with an ordinary chlorine gas is used for the etching of the heat-resistant metal layer 34, but the gate insulating layer 30 comprising SiNx has resistance at that time and does not reduce, so first the heat-resistant metal layer 34 is removed to expose the second amorphous silicon layer 33 in the openings 63A and 65A. Next, dry etching with a fluoride gas is used for etching the second amorphous silicon layer 33 and the first amorphous silicon layer 31, but by applying process conditions such that the gate insulating layer 30 comprising SiNx is etched at nearly the same rate as the amorphous silicon layers 31 and 33, etching of the gate insulating layer 30 (thickness of 0.3 μm) comprising SiNx in the openings 63A and 65A ends when etching of the second amorphous silicon layer 33 (thickness of 0.05 μm) and the first amorphous silicon layer 31 (thickness of 0.2 μm) ends, and the part 73 of the scan lines 11 and the part 75 of the storage capacitor lines 16 are exposed, respectively, in the openings 63A and 65A.

If the etching of the second amorphous silicon layer 33 and the first amorphous silicon layer 31 ends faster than the suitable etching rate, the gate insulating layer 30 in the openings 63A and 65A must be removed by over-etching, but in such a case, the gate insulating layer 30 is already exposed over the entire surface of the glass substrate 2, and the gate insulating layer 30 is reduced as a whole so that a short through the layers between the scan lines 11 and the signal wires 12 formed in a subsequent manufacturing process and a short through the layers between the pixel electrodes 22 and the storage capacitor lines 16 occur readily, decreasing the yield; as a countermeasure thereof, a laminate made of the heat-resistant metal layer 34, the second amorphous silicon layer 33 and the first amorphous silicon layer 31 may be left above the storage capacitor lines 16 and proximate to intersections of the signal line 12 and the scan line 11 similar to the semiconductor layer formation regions, to prevent the thickness reduction of the gate insulating layer 30. In further detail, it is possible to maintain the yield with pattern design.

If the etching rate at which part 73 of the scan line 11 and part 75 of the storage capacitor lines 16 exposed in the etching gas or the etching solution of the heat-resistant metal layer 34 during the etching of the semiconductor layer formation regions is extremely low, the gate insulating layer 30 may be etched in a series all at once to expose part 73 of the scan lines 11 and part 75 of the storage capacitor lines 16 in the openings 63A and 65A, respectively, as in FIG. 5(b) and FIG. 6(b) for cases such as when the heat-resistant metal layer 34 is Cr or Mo (using an etching solution in which a mixed solution of perchloric acid and cerium nitrate is used for Cr etching, and in which a minute amount of ammonia is added to hydrogen peroxide solution for Mo etching) and the scan line 11 is comprised of an Al alloy, for example, after which oxygen plasma treatment is carried out. Then, the heat-resistant metal layer 34 (Cr or Mo) may be removed using the said etching solution using the reduced photosensitive resin patterns 81C as masks, and the second amorphous silicon layer 33 and the first amorphous silicon layer 31 etched with dry etching to expose the gate insulating layer 30, but basically, a selectivity ratio is not obtained in dry etching equivalent to that in wet etching using an etching solution, so in such a case, the etching method first mentioned is adopted.

If a metal silicide with a high melting point is used as the heat-resistant metal layer 34, it is easy to carry out etching equally for the second amorphous silicon layer 33 and the first amorphous silicon layer 31 with dry etching using a fluoride gas. It is possible to remove these three thin films and the gate insulating layer 30 in one series, but instances where a metal silicide with a high melting point is used as the heat-resistant metal layer 34 are not well known, so mention thereof is omitted in the claims of the present invention, but it is desirable to use a metal silicide with a high melting point for the heat-resistant metal layer 34 to simplify the manufacturing process. As to problems with this, the target used at an SPT equipment was given at the top of this document, and in particular, the development of a large target such as one with a side which exceeds 1 m is necessary with the recent increase in size of manufacturing equipments for liquid crystal displays.

After the said photosensitive resin patterns 81C are removed, IZO, ITO, for example, or a mixture thereof is deposited as a transparent conductive layer 91 about 0.1 to 0.2 μm thick using an SPT or other vacuum film-depositing equipment over the entire surface of the glass substrate 2 similar to in Embodiment 1, an then Al or Al (Nd) alloy thin film layer 35 is subsequently deposited about 0.3 μm thick as a low resistant metal layer; the Al or Al (Nd) alloy thin film layer 35, the transparent conductive layer 91, the heat-resistant metal layer 34, and the second amorphous silicon layer 33 are etched and so removed with micro-fabrication technology, the first amorphous silicon layer 31 is etched to leave about 0.05 to 0.1 μm, thereby selectively forming signal lines 12 doubling as source wires comprising a laminate made of 91A and 35A, and forming drain electrodes 21 of the insulating gate-type transistor doubling as pseudo-pixel electrodes P22 comprising a laminate made of 91B and 35B, such as to partially overlap the gate electrodes 11A and forming pseudo-electrode terminals P6 composing part of the signal lines and pseudo-electrode terminals P5 of the scan lines containing part 73 of the exposed scan lines at the same time as the formation of source-drain wires 12 and 21 as shown in FIG. 3(*e*) and FIG. 4(*e*).

After the formation of the source-drain wires 12 and 21, a second SiNx layer about 0.3 μm thick is deposited as a transparent insulating layer over the entire surface of the glass substrate 2 using a PCVD equipment to make a passivation insulating layer 37, openings 38, 63 and 64 are formed on the pseudo-pixel electrodes P22 and the pseudo-electrode terminals P5 and P6, respectively, as shown in FIG. 3(*f*) and FIG. 4(*f*), and the passivation insulating layer and the low resistance metal layers 35A to 35C in the openings are removed to expose the transparent conductive pixel electrodes 22 and the greater part of the transparent conductive electrode terminals 5A and 6A.

The active substrate 2 thus obtained and the color filter 9 are attached together to form a liquid crystal panel, thereby completing Embodiment 2 of the present invention. The construction of a storage capacitor 15 is identical to that in Embodiment 1, though it is easy to interpolate a laminate made of the heat-resistant metal layer 34, the second amorphous silicon layer 33, and the first amorphous silicon layer 31 in addition to the gate insulating layer 30 to suppress shorts between layers through the gate insulating layer as already described. In this case, however, the insulating layers constituting the storage capacitor 15 are made of a laminate made of the gate insulating layer 30 and the first amorphous silicon layer 31, so the area of the storage capacitor 15 not transmitting light increases somewhat, and the decrease in the aperture ratio by that amount cannot be avoided.

As described above, the number of manufacturing processes is decreased in Embodiment 2 by using the same photomask for the semiconductor layer formation process and the contact formation process with half-tone exposure technology, obtaining a liquid crystal display device using four photomasks.

If an suitable insulating layer can be provided to the exposed scan lines such that direct current flow between the scan lines 11 and an opposing electrode 14 on the color filter 9 and the liquid crystal does not deteriorate, then it is possible to decrease the contact formation process by also removing the gate insulating layer to expose the scan lines when forming the semiconductor layer regions. This is described in Embodiment 3. In this case, half-tone exposure technology is not required, so photomask production is extremely easy.

Embodiment 3

In Embodiment 3, the process proceeds identically to Embodiment 1 until after forming scan lines 11 and storage capacitor lines 16, three thin film layers comprising a first SiNx layer 30 composing a gate insulating layer, a first amorphous silicon layer 31 composing a channel for an insulating gate-type transistor including hardly any impurities, and a second amorphous silicon layer 33 composing source-drain of an insulating gate-type transistor including phosphorous, for example, as an impurity are deposited 0.3, 0.2, and 0.05 μm thick, for example, and a thin film layer 34 comprising a heat-resistant metal layer of, for example, Cr, Ta, Mo, or the like, or an alloy or a silicide thereof is then deposited as a heat-resistant metal layer about 0.1 μm thick using an SPT or other vacuum film-depositing equipment.

Figure 5:
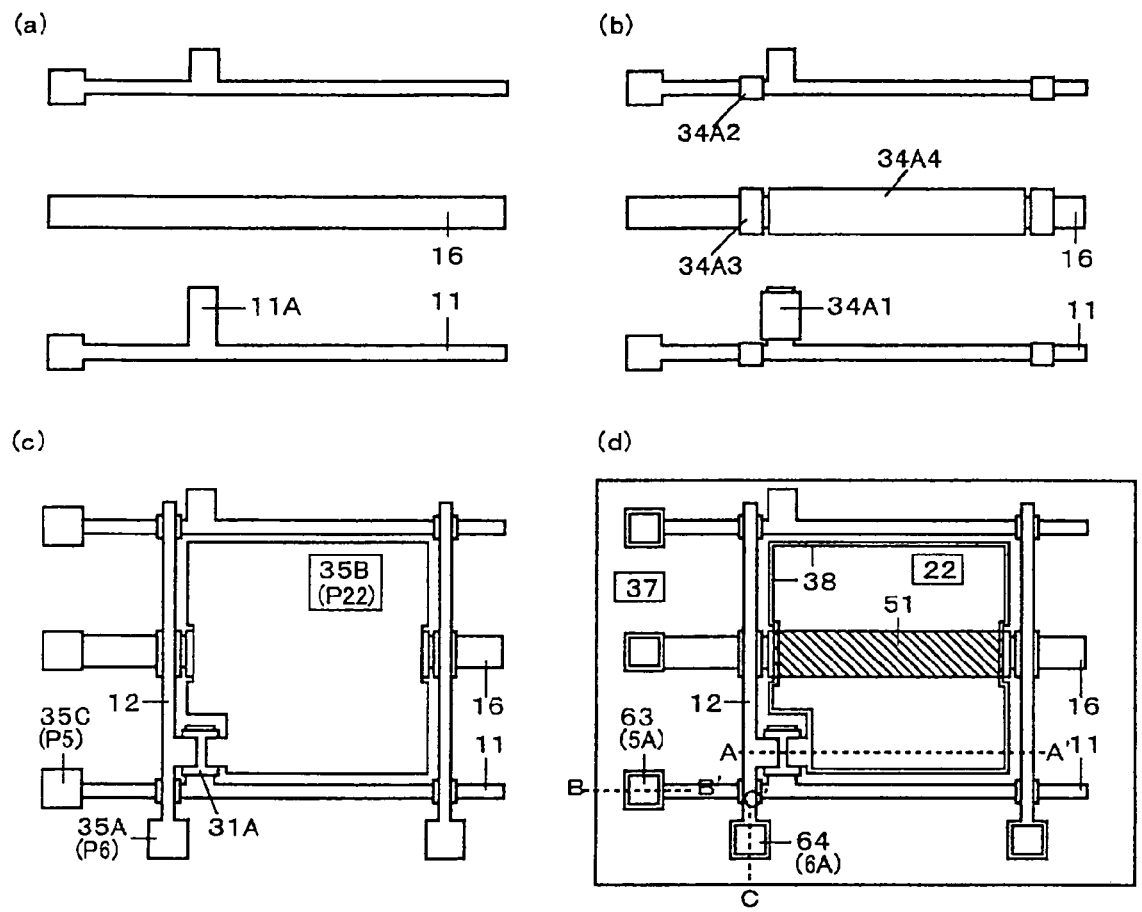
[FIG 5] A plan view of a semiconductor device for the display device according to Embodiment 3 of the present invention
Figure 6:
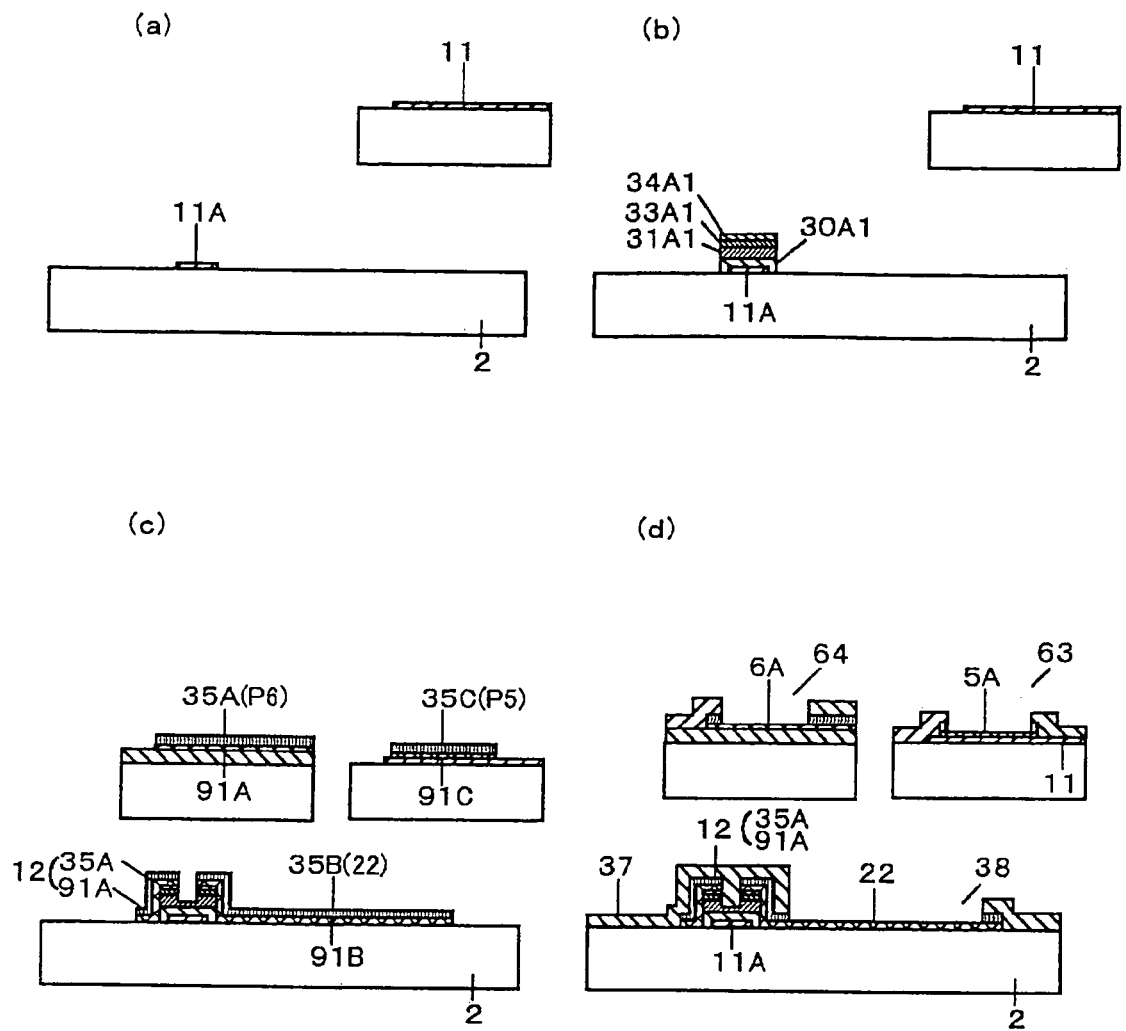
[FIG. 6] A cross-sectional view of the manufacturing process for a semiconductor device for the display device according to Embodiment 3 of the present invention

Further as shown in FIG. 5(*b*) and FIG. 6(*b*), the heat-resistant metal layer 34, the second amorphous silicon layer 33, the first amorphous silicon layer 31, and the gate insulating layer are selectively removed using micro-fabrication technology to form semiconductor layer regions comprising laminates made of heat-resistant metal layers 34A1 to 34A4, second amorphous silicon layers 33A1 to A4, first amorphous silicon layers 31A1 to A4, and gate insulating layers 30A1 to A4, proximate to the semiconductor layer formation regions of the insulating gate-type transistors, that is proximate to the gate electrodes 11A, in the proximity of the regions where the scan lines 11 and the signal lines intersect, in the proximity of the regions where the storage capacitor lines 16 and the signal lines 12 intersect, and in and around the storage capacitor formation regions, that is, the greater part of the storage capacitor lines 16, and the scan lines 11 and the storage capacitor lines 16 are exposed.

Then, similar to Embodiment 1, IZO, ITO, for example, or a mixture thereof is deposited as a transparent conductive layer 91 about 0.1 to 0.2 μm thick using an SPT or other vacuum film-depositing equipment over the entire surface of the glass substrate 2. After subsequently depositing an Al or Al (Nd) alloy thin film layer 35 about 0.3 μm thick as a low resistance metal layer, the signal lines 12 doubling as source wires comprising a laminate made of 91A and 35A and drain electrodes 21 of insulating gate-type transistors doubling as pseudo-pixel electrodes P22 comprising a laminate made of 91B and 35B are formed such as to partially overlap the gate electrodes 11A as shown in FIG. 5(*c*) and FIG. 6(*c*), and at the same time as pseudo-electrode terminals P5 of the scan lines on part of the exposed scan lines 11 and pseudo-electrode terminals P6 composing part of the signal lines 12 are formed, the source-drain wires 12 and 21 are formed.

After the formation of the source-drain wires 12 and 21, a second SiNx layer about 0.3 μm thick is deposited as a transparent insulating layer over the entire surface of a glass substrate 2 using a PCVD equipment to make a passivation insulating layer 37, openings 38, 63 and 64 are formed on pseudo-pixel electrodes P22 and on pseudo-electrode terminals P5 and P6, respectively, as shown in FIG. 5(*d*) and FIG. 6(*d*), and the passivation insulating layer and the low resistance metal layers 35A to 35C in the openings are selectively removed to expose the transparent conductive pixel electrodes 22 and greater part of the transparent conductive electrode terminals 5A and 6A.

Figure 11:
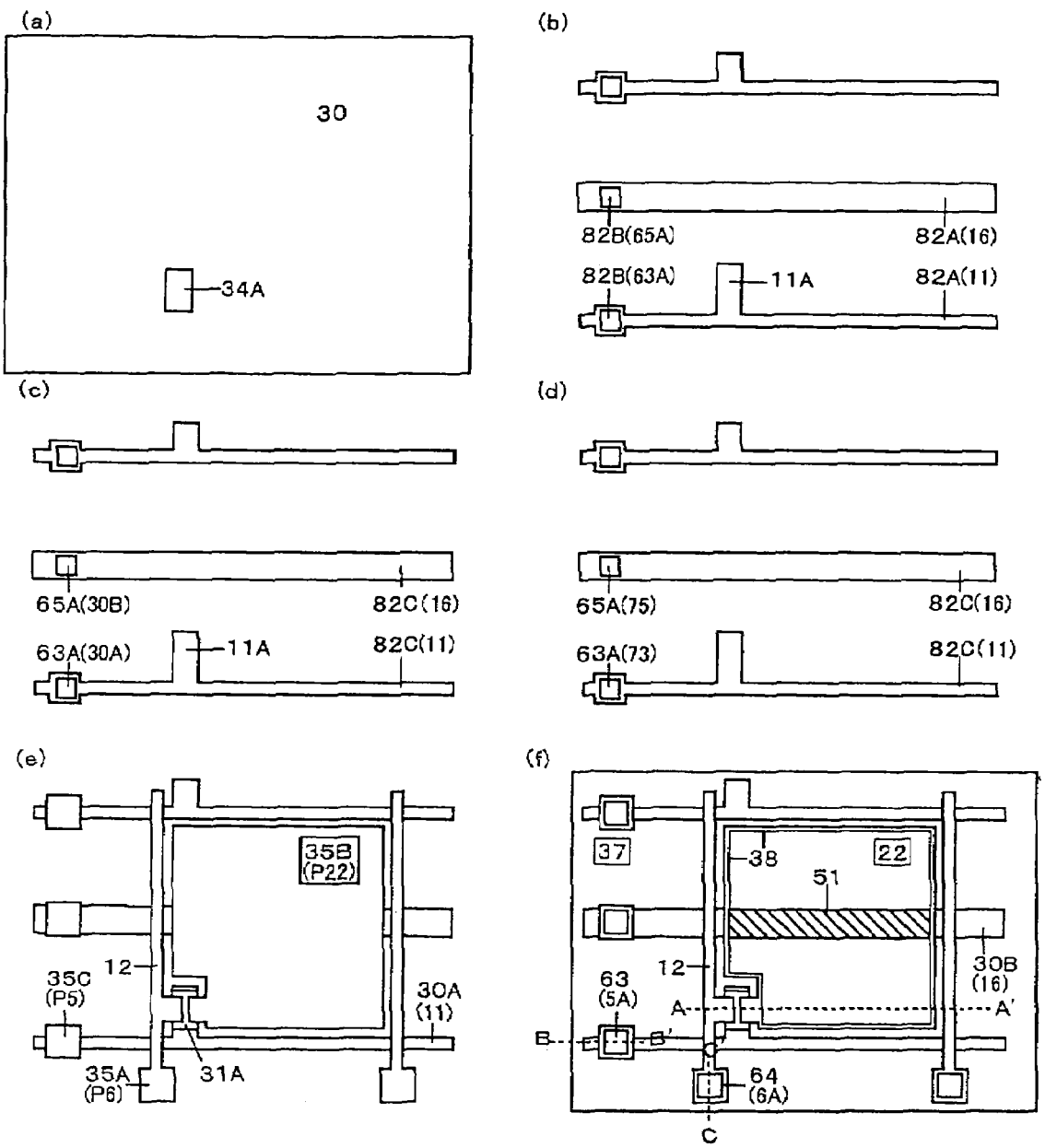
[FIG. 11] A plan view of a semiconductor device for the display device according to Embodiment 6 of the present invention

The active substrate 2 thus obtained and the color filter 9 are attached together to form a liquid crystal panel, thereby completing Embodiment 3 of the present invention. A construction of a region 51 (a right-slanting oblique portion) on which the pixel electrode 22 and the storage capacitor line 16 are overlaid in a planar fashion via the heat-resistant metal layer 34A4, the second amorphous silicon 33A4, the first amorphous silicon 31A4, and the gate insulating layer 30A4 (none of which are illustrated) as shown in FIG. 11(*e*) exemplifies the storage capacitor 15.

In this manner, the gate insulating layer is also removed during the semiconductor layer formation process to expose the scan lines in Embodiment 3, so the contact formation process is streamlined, furthering the decrease in the number of manufacturing processes without concomitant use of half-tone exposure technology, and a liquid display device is obtained using four photomasks, but the half-tone exposure technology can be applied to other main processes to make a four-mask process with different details as explained below.

Embodiment 4

In Embodiment 4, first, a heat-resistant metal layer of, for example, Cr, Ta, Mo, or the like, or an alloy or a silicide thereof is deposited about 0.1 to 0.3 μm thick on the main surface of a glass substrate 2 using an SPT or other vacuum film-depositing equipment. If an anodized layer is selected as the insulating layer to be formed on the sides of the scan lines, it is necessary that the anodized layer maintain its insularity, in which case, considering that Ta by itself has a high resistance and that Al by itself is poor in heat-resistance, a single layer construction of an Al (Zr, Ta, or Nd) alloy or the like with a high heat-resistance or a laminate construction of an Al/Ta, Ta/Al/Ta, Al/Al (Ta, Zr, or Nd) alloy or the like may be selected for the scan line to lower the resistance thereof as already described. Al (Ta, Zr, or Nd) means an Al alloy with high heat resistance to which no more than a number of percent of Ta, Zr, or Nd or similar is added.

Next, three thin film layers comprising a first SiNx layer 30 composing a gate insulating layer, a first amorphous silicon layer 31 composing a channel for an insulating gate-type transistor including hardly any impurities, and a second amorphous silicon layer 33 composing source-drain for an insulating type transistor including phosphorous, for example, as an impurity are successively deposited about 0.3, 0.2, and 0.05 μm thick, for example, over the entire surface of the glass substrate 2 using a PCVD equipment. Then a thin film layer 34 comprising a heat-resistant layer of, for example, Ti, Cr, Mo, or the like, or a silicide thereof is then deposited as a heat-resistant metal layer about 0.1 μm thick using an SPT or other vacuum film-depositing equipment. Photosensitive resin patterns 82A and 82B are formed using half-tone exposure technology such that the thickness of the contact formation regions 82B corresponding to openings 63A and 65A on the scan lines 11 and on the storage capacitor lines 16 outside an image display region is 1 μm, for example, and the thickness of the regions 82A corresponding to the scan lines 11 and the storage capacitor lines 16 is 2 μm, and the heat-resistant metal layer 34, the second amorphous silicon layer 33, the first amorphous silicon layer 31, the gate insulating layer 30, and the first metal layer are selectively removed using the photosensitive resin patterns 82A and 82B as masks to expose the glass substrate 2 as shown in FIG. 7(a) and FIG. 8(a).

Continuing, by reducing the said photosensitive resin patterns 82A and 82B by 1 μm or more using oxygen plasma or other ashing means, the photosensitive resin pattern 82B can be eliminated to expose the metal resistant layers 34A and 34B in the said openings 63A and 65A, and the reduced photosensitive resin patterns 82C left unchanged above the scan lines 11 and above the storage capacitor lines 16 as shown in FIGS. 7(b) and 8(b). The pattern width of the photosensitive resin pattern 82C (the black region), that is, the gate electrode 11A is the sum of the mask alignment accuracy and the length between the source and the drain wires, so the dimension accuracy is not strict, at 10 to 12 μm at the least with the source-drain wire interval 4 to 6 μm and the alignment accuracy ±3 μm. Also, the pattern width for the storage capacitor line 16 and the scan line 11 is set ordinarily at 10 μm or wider due to the resistance value. However, because the semiconductor layers cannot be formed wider than the gate electrodes 11A in Embodiment 4, if the resist pattern is isotropically reduced during the conversion of the resist pattern 82A to 82C, not only does the dimension decrease 2 μm, but the mask alignment accuracy during the subsequent source-drain wires formation decreases 1 μm to ±2 μm, so the effects of the latter are more strict in terms of process than the former. Accordingly, it is desirable to increase the anisotropicity to control changes in the pattern dimensions during the said oxygen plasma treatment. Alternatively, measures such as providing for a process-based approach of designing the pattern dimensions of the resist pattern 82A larger beforehand, anticipating the amount of dimension change in the resist pattern are desirable.

Figure 15:
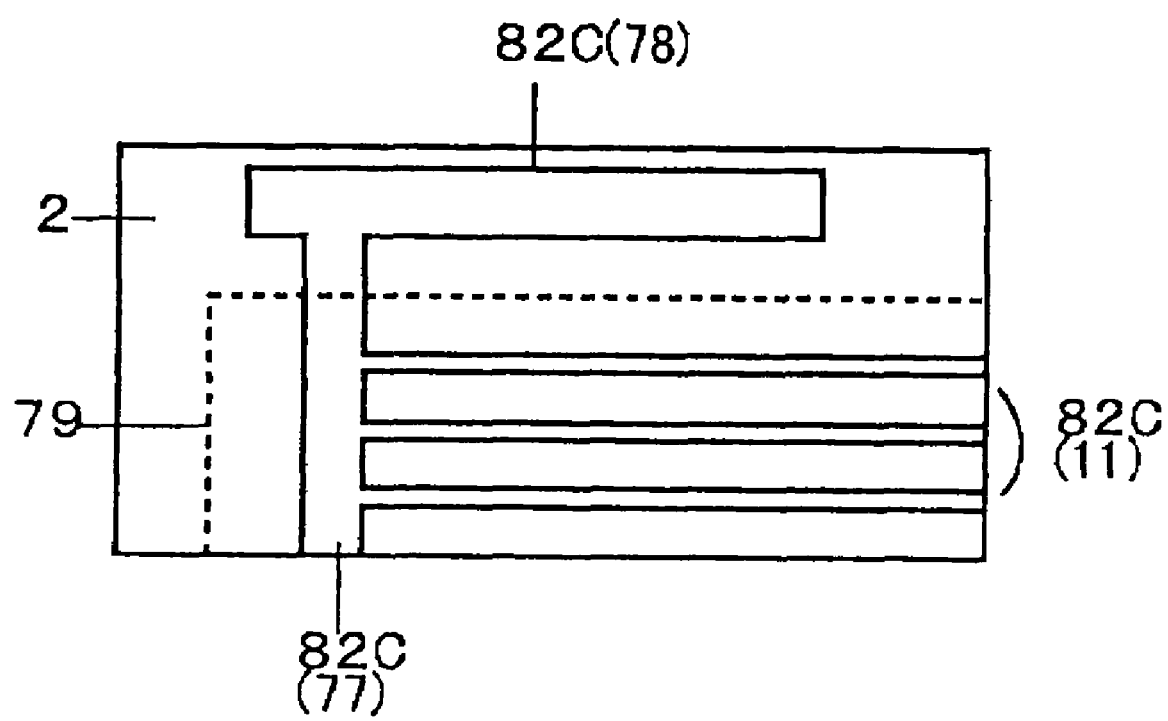
[FIG. 15] A layout view of a connection pattern for insulating layer formation in Embodiment 4 and Embodiment 6

Continuing, insulating layers 76 are formed in the sides of the gate electrodes 11A as shown in FIG. 8(b). Because of this, a connection pattern 78 is needed to provide potential during anodization or electro-deposition at the outer periphery of the glass substrate 2 and the wire 77 bundled in parallel with the scan lines 11 (as with the storage capacitor lines 16, whose illustration is omitted), and a film-depositing region 79 is limited to inside the pattern 78 using suitable mask means for the amorphous silicon layers 31 and 33 and the silicon layer nitride layer 30 made with a plasma CVD equipment and the heat-resistant metal layer made with an SPT or other vacuum film-depositing equipment, and it must be possible to provide potential to the connection pattern 78 as shown in FIG. 15. When the photosensitive resin pattern 82C (78) on the connection pattern 78 is therefore pierced to provide a positive potential to the connection pattern 78 (scan lines 11), causing a chemical solution whose main ingredient is ethylene glycol to penetrate the glass substrate 2 and anodize using connection means such as an alligator clip having sharp points, if the scan line 11 is comprised of an Al alloy, an aluminum oxide (Al2O3) is formed 0.3 μm thick having a chemical voltage of 200 V, for example. If electro-deposition is used, a polyimide resin layer is formed 0.3 μm thick having an electro-deposition voltage number V using a polyimide electro-deposition solution with a pendant carboxyl group as shown in the literature, the November 2002 issue of Kobunshi Kako. A point to keep in mind when forming the insulating layers on the exposed sides of the scan lines 11 and the storage capacitor lines 16 is that if the parallel connection of at least the scan lines 11 is not undone at some point in the subsequent manufacturing process, it goes without saying that trouble will occur not only in the electrical test of the active substrate 2 but in the actual operation of the liquid crystal display device as well. Removal means using transpiration by laser light irradiation or mechanical excision by scribing are simple, and so a detailed explanation thereof is omitted.

[Non-Patent Literature 1] Monthly Kobunshi Kako, November 2002 issue

After the insulating layers 76 are formed, the heat-resistant metal layers 34A and 34B, the second amorphous silicon layers 33A and 33B, the first amorphous silicon layers 31A and 31B and the gate insulating layers 30A and 30B in the openings 63A and 65A are selectively etched using the photosensitive resin patterns 82C as masks to expose part 73 of the scan lines 11 and part 75 of the storage capacitor lines 16 respectively as shown in FIGS. 7(c) and 8(c).

After removing the said photosensitive resin patterns 82C, the semiconductor layer regions comprising a laminate made of a heat-resistant metal layer 34A, a second amorphous silicon layer 33A, and a first amorphous silicon layer 31A is selectively left on the gate electrodes 11A in island-forms using micro-fabrication technology to expose the gate insulating layers 30A on the scan lines 11 and the gate insulating layers 30B on the storage capacitor lines 16 as shown in FIG. 7(d) and FIG. 8(d). If part 73 of the scan lines 11 and part 75 of the storage capacitor lines 16 exposed in the openings 63A and 65A are covered with a photosensitive resin pattern, problems may be easily avoided such as thickness reduction or transmutation when part 73 of the scan lines 11 and part 75 of the storage capacitor lines 16 to form the semiconductor layer regions. In further detail, the heat-resistant metal layer 34C, the second amorphous silicon layer 33C, and the first amorphous silicon layer 31C partially remain at the peripheries of the openings 63A and 65A, but this does not hinder contact formation in the scan lines 11 and the storage capacitor lines 16 whatsoever.

Next, similar to Embodiment 1, IZO or ITO, for example, or a mixture thereof is deposited as a transparent conductive layer 91 about 0.1 to 0.2 µm thick over the entire surface of a glass substrate 2 using an SPT or other vacuum film-depositing equipment, and an Al or Al (Nd) alloy thin layer 35 about 0.3 µm thick is subsequently deposited as a low resistance metal layer; then, the Al or Al (Nd) alloy thin film layer 35, the transparent conductive layer 91, the heat-resistant metal layer 34A, and the second amorphous silicon layer 33A are etched using micro-fabrication technology and thereby removed, and the first amorphous silicon layer 31A is etched to leave about 0.05 to 0.1 µm, thereby selectively forming signal lines 12 doubling as source wires comprising a laminate made of 91A and 35A, and drain electrodes 21 of insulating gate-type transistors doubling as pseudo-pixel electrodes P22 comprising a laminate made of 91B and 35B, such as to partially overlap semiconductor layer regions 34A (the gate electrodes 11A), and forming pseudo-electrode terminals P5 of the scan lines is formed containing the heat-resistant metal layer 34C, the second amorphous silicon layer 33C, the first amorphous silicon layer 31C at the peripheries of the openings 63A and part 73 of the exposed scan lines, and forming pseudo-electrode terminals P6 composing part of the signal lines 12 at the same time as the formation of source-drain wires 12 and 21 as shown in FIG. 7(e) and FIG. 8(e).

After the formation of the source-drain wires 12 and 21, a second SiNx layer about 0.3 µm thick is deposited as a transparent insulating layer over the entire surface of the glass substrate 2 using a PCVD equipment to make a passivation insulating layer 37, openings 38, 63 and 64 are formed on the pseudo-pixel electrodes P22 and the pseudo-electrode terminals P5 and P6, respectively, as shown in FIG. 7(f) and FIG. 8(f), and the passivation insulating layer and the low resistance metal layers 35A to 35C in the openings are removed to expose the transparent conductive pixel electrodes 22 and greater part of the transparent conductive electrode terminals 5A and 6A.

The active substrate 2 thus obtained and the color filter 9 are attached together to form a liquid crystal panel, thereby completing Embodiment 4 of the present invention. As shown in FIG. 7(f), the construction of the storage capacitor 15 is exemplified by a region 51 (a right-slanting oblique portion) on which the pixel electrode 22 and the storage capacitor line 16 are overlaid in a planar fashion via the gate insulating layer 30B.

As described above, the number of manufacturing processes is decreased in Embodiment 4 by using the same photomask for the scan line formation process and the contact formation process with half-tone exposure technology, obtaining a liquid crystal display device using four photomasks, but the present inventor has devised combinations for further streamlining by which a four-mask process is enabled having different details as exposed below.

Embodiment 5

In Embodiment 5, first, a heat resistant-metal layer of, for example, Cr, Ta, Mo, or the like, or an alloy or a silicide thereof, is deposited about 0.1 to 0.3 µm thick on the main surface of a glass substrate 2 using an SPT or other vacuum film-depositing equipment. When selecting an anodized layer for an insulating layer formed on the sides of the scan lines, it is necessary to retain insularity in the anodized layer, suitable materials for which case have already been discussed.

Next, three thin film layers comprising a first SiNx layer 30 composing a gate insulating layer, a first amorphous silicon layer 31 composing a channel for an insulating gate-type transistor including hardly any impurities, and a second amorphous silicon layer 33 composing source-drain for an insulating gate-type transistor including phosphorous, for example, as an impurity are successively deposited about 0.3, 0.2, and 0.05 µm thick, for example, over the entire surface of the glass substrate 2 using a PCVD equipment. A heat-resistant metal layer 34 of Ti, Cr, Mo, or the like, for example, or a silicide thereof is deposited as a heat-resistant metal layer about 0.1 µm thick using an SPT or other vacuum film-depositing equipment, and photosensitive resin patterns 84A and 84B are formed using half-tone exposure technology such that the thickness of the regions 84A at the semiconductor layer formation regions, that is, above the gate electrodes 11A is 2 µm, for example, and the thickness of the regions 84B corresponding to the scan lines 11 and the storage capacitor lines 16 is 1 µm as shown in FIG. 9(a) and FIG. 10(a). Then, the heat-resistant metal layer 34, the second amorphous silicon layer 33, the first amorphous silicon layer 31, the gate insulating layer 30, and the first metal layer are selectively removed using these photosensitive resin patterns 84A and 84B as masks to expose the glass substrate 2.

Continuing, by reducing the said photosensitive resin patterns 84A and 84B by 1 µm or more using oxygen plasma or other ashing means, the photosensitive resin patterns 84B can be eliminated, exposing the heat-resistant metal layers 34A and 34B, and leaving the reduced photosensitive resin patterns 84C unchanged at the semiconductor layer formation regions as shown in FIGS. 9(b) and 10(b). The pattern width of the photosensitive resin pattern 84C, that is the semiconductor layer formation region (gate electrode 11A) is the sum of the mask alignment accuracy and the length between the source and the drain wires, so the dimension accuracy is not strict, at 10 to 12 µm at the least with the source-drain wire interval 4 to 6 µm and the alignment accuracy ±3 µm. Nevertheless, when the resist patterns are isotropically reduced 1 µm during the conversion from the resist pattern 84A to 84C, not only does the dimension decrease 2 µm, but the mask alignment accuracy decreases 1 µm to ±2 µm during the formation of the subsequent source-drain wires, so the latter is stricter in terms of process than the former. In the said oxygen plasma treatment, it is therefore desirable to suppress change in the pattern dimensions by increasing the anisotropicity. Also, it is desirable to take measures such as taking a process approach with exposure and development conditions such that the pattern size of the resist pattern 84A increases.

Continuing, the heat-resistant metal layers 34A and 34B, the second amorphous silicon layers 33A and 33B, and the first amorphous silicon layers 31A and 31B are selectively etched using the reduced photosensitive resin patterns 84C as masks to form semiconductor layer regions comprising laminates made of the heat-resistant metal layer 34A, the second amorphous silicon layer 33A, and the first amorphous silicon layer 31A above the gate electrodes 11A, and expose the gate insulating layers 30A and 30B on the scan lines 11 and storage capacitor lines 16, respectively, as shown in FIGS. 9(c) and 10(c).

Figure 16:
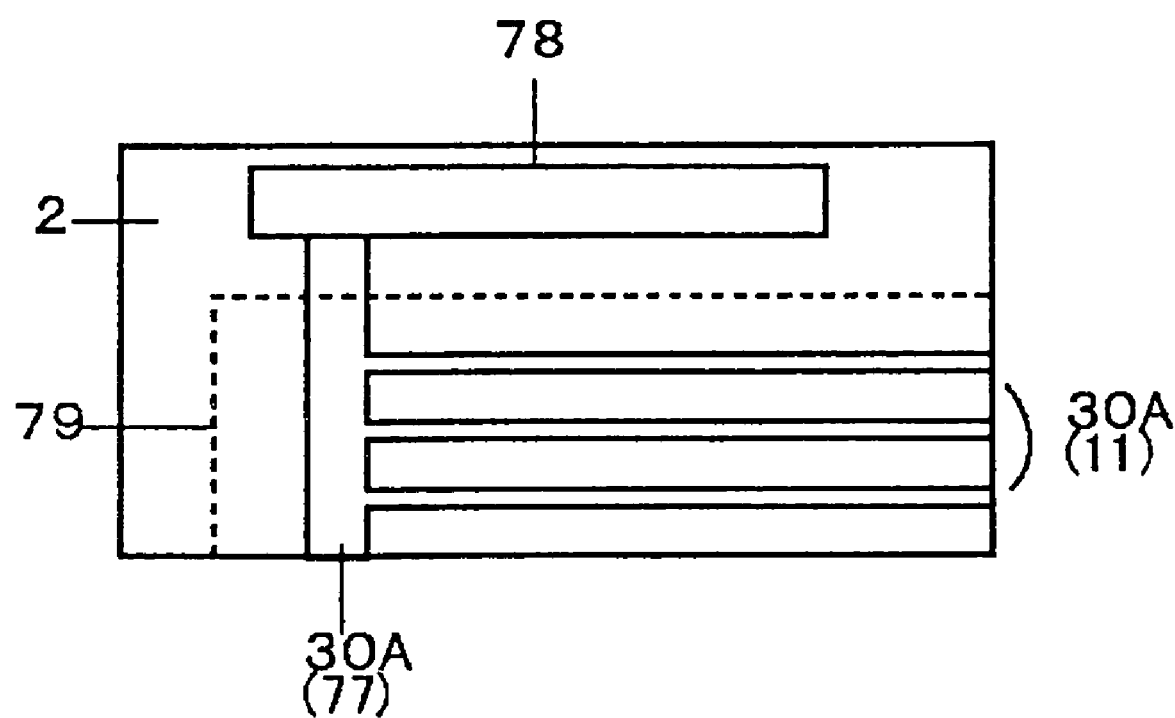
[FIG. 16] A layout view of a connection pattern for insulating layer formation in Embodiment 5

After removing the said photosensitive resin patterns 84C, insulating layers 76 are formed on the sides of the gate electrodes 11A. Because of this, a connection pattern 78 is needed to provide potential during anodization or electro-deposition at the outer periphery of the glass substrate 2 and the wire 77 bundled in parallel with the scan lines 11 (as with the storage capacitor lines 16 whose illustration is omitted), and a film-depositing region 79 is limited to inside the pattern 78 using suitable mask means for the amorphous silicon layers 31 and 33 and the silicon nitride layer 30 made with a PCVD equipment, and the heat-resistant metal layer 34 made with an SPT or other vacuum film-depositing equipment; at the least, the connection pattern 78 needs to be exposed as shown in FIG. 16. When a positive potential is provided to the scan lines 11 to cause a chemical solution whose main ingredient is ethylene glycol to penetrate the glass substrate 2 and anodize using connection means such as an alligator clip having sharp points on the connection pattern 78, if the scan line 11 is comprising of an Al alloy, an aluminum oxide (Al2O3) is formed 0.3 μm thick having a chemical voltage of 200 V, for example. If electro-deposition is used, a polyimide resin layer is formed 0.3 μm thick having an electro-deposition voltage number V using a polyimide electro-deposition solution with a pendant carboxyl group as described above. It should not be forgotten that there are secondary effects in Embodiment 5 wherein the pinholes generated in the gate insulating layers 30A and 30B on the scan lines 11 and on the storage capacitor lines 16 are embedded with polyimide resin or aluminum oxide, which is an insulating layer, due to the formation of the insulating layer 76, so shorts through the layers between the source-drain wires 12 and 21 described below and the scan lines 11 and the storage capacitors 16 are suppressed.

Openings 63A and 65A are formed in the contact formation regions of the scan lines 11 and the storage capacitors line 16 outside the image display region using micro-fabrication technology as shown in FIGS. 9(d) and 10(d), and the gate insulating layers 30A and 30B in the openings 63A and 65B are selectively removed to expose part 73 of the scan lines 11 and part 75 of the storage capacitor linse 16 respectively.

Next, similar to Embodiment 1, IZO or ITO, for example, or a mixture thereof is deposited as a transparent conductive layer 91 about 0.1 to 0.2 μm thick over the entire surface of the glass substrate 2 using an SPT or other vacuum film-depositing equipment, and the Al or Al (Nd) alloy thin layer 35 about 0.3 μm thick is subsequently deposited as a low resistance metal layer; then, the Al or Al (Nd) alloy thin film layer 35, the transparent conductive layer 91, and the second amorphous silicon layer 33A are etched with micro-fabrication technology and thereby removed; and then the first amorphous silicon layer 31A is etched to leave about 0.05 to 0.1 μm, thereby selectively forming signal lines 12 doubling as source wires comprising a laminate made of 91A and 35A, and drain electrodes 21 for insulating gate-type transistors doubling as pseudo-pixel electrodes P22 comprising a laminate made of 91B and 35B such as to partially overlap the semiconductor layer regions 34A (gate electrodes 11A), as shown in FIG. 9(e) and FIG. 10(e), and forming pseudo-electrode terminals P5 of the scan lines containing part 73 of the scan lines exposed in openings 63A, and forming pseudo-electrode terminals P6 composing part of the signal lines 12 at the same time as the formation of source-drain wires 12 and 21.

After the formation of the source-drain wires 12 and 21, a second SiNx layer about 0.3 μm thick is deposited as a transparent insulating layer using a PCVD equipment over the entire surface of the glass substrate 2 to make a passivation insulating layer 37, openings 38, 63 and 64 are formed on the pseudo-pixel electrodes P22 and on the pseudo-electrode terminals P5 and P6, respectively, as shown in FIG. 9(f) and FIG. 10(f), and the passivation insulating layer and the low resistance metal layers 35A to 35C in the respective openings are selectively removed to expose the transparent conductive pixel electrodes 22 and greater part of transparent conductive electrode terminals 5A and 6A.

The active substrate 2 thus obtained and the color filter 9 are attached together to form a liquid crystal panel, thereby completing Embodiment 5 of the present invention. A storage capacitor 15 is constructed identically to that in Embodiment 4 with a region 51 (a right-slanting oblique portion) on which the pixel electrode 22 and the storage capacitor line 16 are overlaid in a planar fashion via the gate insulating layer 30B, as shown in FIG. 9(f).

As described above, the scan line formation process and the semiconductor layer formation process, furthermore the source-drain formation process and the pixel electrode formation process, are streamlined by using one mask with half-tone exposure technology to obtain a liquid display device in Embodiment 5 with four photomasks. Still, by rearranging the sequence of the photolithographic etching processes from the perspective of not having them conventionally, it is possible to reduce the number of manufacturing processes a bit more. This is described in Embodiment 6.

Embodiment 6

To begin with, in Embodiment 6, a heat resistant-metal layer of, for example, Cr, Ta, Mo, or the like, or an alloy or a silicide thereof is deposited as a first metal layer 92 about 0.1 to 0.3 μm thick on the primary surface of a glass substrate 2 using an SPT or other vacuum film-depositing equipment as in Embodiment 5.

Next, three thin film layers comprising a first SiNx layer 30 composing a gate insulating layer, a first amorphous silicon layer 31 composing a channel for an insulating gate-type transistor including hardly any impurities, and a second amorphous silicon layer 33 composing a source and drain for an insulating gate-type transistor including phosphorous, for example, as an impurity are successively deposited about 0.3, 0.2, and 0.05 μm thick, for example, over the entire surface of a glass substrate 2 using a PCVD equipment. Then a thin film layer 34 comprising a heat-resistant metal layer of, for example, Ti, Cr, Mo, or the like, or a silicide thereof is deposited 0.1 μm thick using an SPT or other vacuum film-depositing equipment, and a semiconductor layer region comprising a laminate made of a heat-resistant metal layer 34A, a second amorphous silicon layer 33A, and a first amorphous silicon layer 31A is selectively formed with micro-fabrication technology to expose the gate insulating layer 30 as shown in FIG. 11(a) and FIG. 12(a).

Continuing, photosensitive resin patterns 82A and 82B are formed using half-tone exposure technology such that the thickness of the region 82B corresponding to the openings 63A and 65A, which are contact formation regions, is 1 μm, for example, and the thickness of the regions 82A corresponding to the scan lines 11 and the storage capacitors 16 is 2 μm, and at the least the gate insulating layer 30 and the first metal layer 92 are selectively removed using the photosensitive resin patterns 82A and 82B as masks to expose the glass substrate 2 as shown in FIG. 11(b) and 12(b). Although it is logical to set the pattern width of the photosensitive resin pattern 82A a bit larger than the semiconductor layer region comprising a laminate made of the heat-resistant metal layer 34A, the second amorphous silicon layer 33A, and the first amorphous silicon layer 31A, a defect then occurs where the size of the insulating gate-type transistor becomes somewhat large. On the other hand, even if the pattern width of the photosensitive resin pattern 82A is set somewhat smaller than the semiconductor layer region comprising the said laminate, the semiconductor layer comprising the said laminate acts as a mask during etching of the gate insulating layer 30 and the first metal layer 92 and so is also etched, tapering its cross-sectional form, so in either case, the pattern width of the semiconductor layer comprising the said laminate becomes smaller than the gate insulating layer 30A and the gate electrode 11A.

Continuing, by reducing the said photosensitive resin patterns 82A and 82B by 1 μm or more using oxygen plasma or other ashing means, the photosensitive resin patterns 82B can be eliminated, exposing the gate insulating layers 30A and 30B in the openings 63A and 65A, and leaving the reduced photosensitive resin patterns 82C unchanged on the scan lines 11 and the storage capacitor lines 16 as shown in FIGS. 11(c) and 12(c). Accordingly, it is desirable to increase the anisotropicity to control changes in the pattern dimensions during the said oxygen plasma treatment. Alternatively, it has already been discussed that measures such as providing for a process-approach by designing the pattern dimension of the resist pattern 82A larger beforehand, anticipating the amount of dimension change in the resist pattern are desirable.

Then, insulating layers 76 are formed in the sides of the gate electrodes 11A as shown in FIG. 12(c). Because of this, as in Embodiment 4, a connection pattern 78 is needed to provide potential during electro-deposition or anodization at the periphery of the glass substrate and the wire 77 bundled in parallel with the scan line 11, furthermore a film-depositing region 79 is limited to the inside of the connection pattern 78 using suitable mask means for the amorphous silicon layers 31 and 33 and the silicon nitride layers 30 made by a PCVD equipment and the heat-resistant metal layer 34 made with an SPT, and potential must be provided to the connection pattern 78 as shown in FIG. 15. The photosensitive resin pattern 82C (78) on the connection pattern 78 is therefore pierced to provide a positive potential to the scan lines 11, causing a chemical solution whose main ingredient is ethylene glycol to penetrate the glass substrate 2 and anodize using connection means such as an alligator clip having sharp points, and an aluminum oxide (Al2O3) layer, which is an anodized layer, or a polyimide resin layer using a polyimide electro-deposition solution including a pendant carboxyl group through electrode-position is formed.

After the formation of the insulating layers 76, the gate insulating layers 30A and 30B in the openings 63A and 65A are selectively etched using the reduced photosensitive resin patterns 82C as masks to expose part 73 of the scan lines 11 and part 75 of the storage capacitor lines 16 respectively as shown in FIGS. 11(d) and 12(d).

Then, the reduced photosensitive resin patterns 82C are removed, IZO or ITO, for example, or a mixture thereof is deposited as a transparent conductive layer 91 about 0.1 to 0.2 μm thick using an SPT or other vacuum film-depositing equipment over the entire surface of the glass substrate 2, and an Al or Al (Nd) alloy thin film layer 35 about 0.3 μm thick is subsequently deposited as a low resistance metal layer. The Al or Al (Nd) alloy thin film layer 35, the transparent conductive layer 91, and the second amorphous silicon layer 33A are removed by etching using micro-fabrication technology, and about 0.05 to 0.1 μm of the first amorphous silicon layer 31A is left by etching, thereby selectively forming signal lines 12 doubling as source wires comprising a laminate made of 91A and 35A, and drain electrodes 21 for insulating gate-type transistors doubling as pseudo-pixel electrodes P22 comprising a laminate made of 91B and 35B, such as to partially overlap the semiconductor regions 34A, and forming pseudo-electrode terminals P5 of the scan lines containing part 73 of the scan lines exposed in the opening 63A, and forming pseudo-electrode terminals P6 composing part of the signal lines 12 at the same time as the formation of the source-drain wires 12 and 21, as shown in FIG. 11(e) and FIG. 12(e).

After the formation of the source-drain wires 12 and 21, a second SiNx layer about 0.3 μm thick is deposited as a transparent insulating layer over the entire surface of the glass substrate 2 using a PCVD equipment to make a passivation insulating layer 37, openings 38, 63 and 64 are formed on the pseudo-pixel electrodes P22 and the pseudo-electrode terminals P5 and P6, respectively, as shown in FIG. 11(f) and FIG. 12(f), and the passivation insulating layer and the low resistance metal layers 35A to 35C in the openings are removed to expose the transparent conductive pixel electrodes 22 and the greater part of the transparent conductive electrode terminals 5A and 6A.

The active substrate 2 thus obtained and the color filter 9 are attached together to form a liquid crystal panel, thereby completing Embodiment 5 of the present invention. A storage capacitor 15 is constructed identically to that in Embodiment 4 with a region 51 (a right-slanting oblique portion) on which the pixel electrode 22 and the storage capacitor line 16 are overlaid in a planar fashion via the gate insulating layer 30B as shown in FIG. 11(f).

As shown in Embodiment 3, if a suitable insulating layer can be provided to the exposed scan lines such that a direct current flows between the scan lines 11 and the opposing electrode 14 on the color filter 9 and the liquid crystal does not deteriorate, the contact formation process can be eliminated by removing the gate insulating layer to expose the scan lines during the formation of the semiconductor layer regions. In Embodiment 7, as a result of reducing the scan line formation process and the semiconductor layer formation process through half-tone exposure technology, insulating layers are formed by electro-deposition or anodization on the sides of the exposed scan lines so that the scan lines and signal lines can intersect, and a passivation insulating layer is used in the conventional manner as an insulating layer on the glass substrate so as to obtain a liquid crystal display device in which the exposed scan lines are once again insulated.

Embodiment 7

To begin with, in Embodiment 7, a first metal layer 92 is deposited about 0.1 to 0.3 μm thick on a primary surface of a glass substrate 2 using an SPT or other vacuum film-depositing equipment. Next, three thin film layers comprising a first SiNx layer 30 composing a gate insulating layer, a first amorphous silicon layer 31 composing a channel for an insulating gate-type transistor including hardly any impurities, and a second amorphous silicon layer 33 composing source-drain of an insulating to 84A4 and 84B are reduced at least 1 μm using oxygen plasma or other ashing means to eliminate the photosensitive resin patterns 84B. The heat-resistant metal layers 34A and 34B may be exposed, and the reduced photosensitive resin patterns 84C1 to 84C4 left unchanged only above the gate electrodes 11A, at the regions proximate to where the scan lines 11 and the signal lines 12 intersect, at the regions proximate to where the storage capacitor lines 16 and the signal lines 12 intersect, and above the greater part of the storage capacitor lines 16 as shown in FIGS. 13(b) and 14(b). In the said oxygen plasma treatment, it has already been described that it is desirable to control change in the pattern dimensions by increasing the anisotropicity such that the mask alignment accuracy in the subsequent source-drain wire formation process does not drop.

Figure 17:
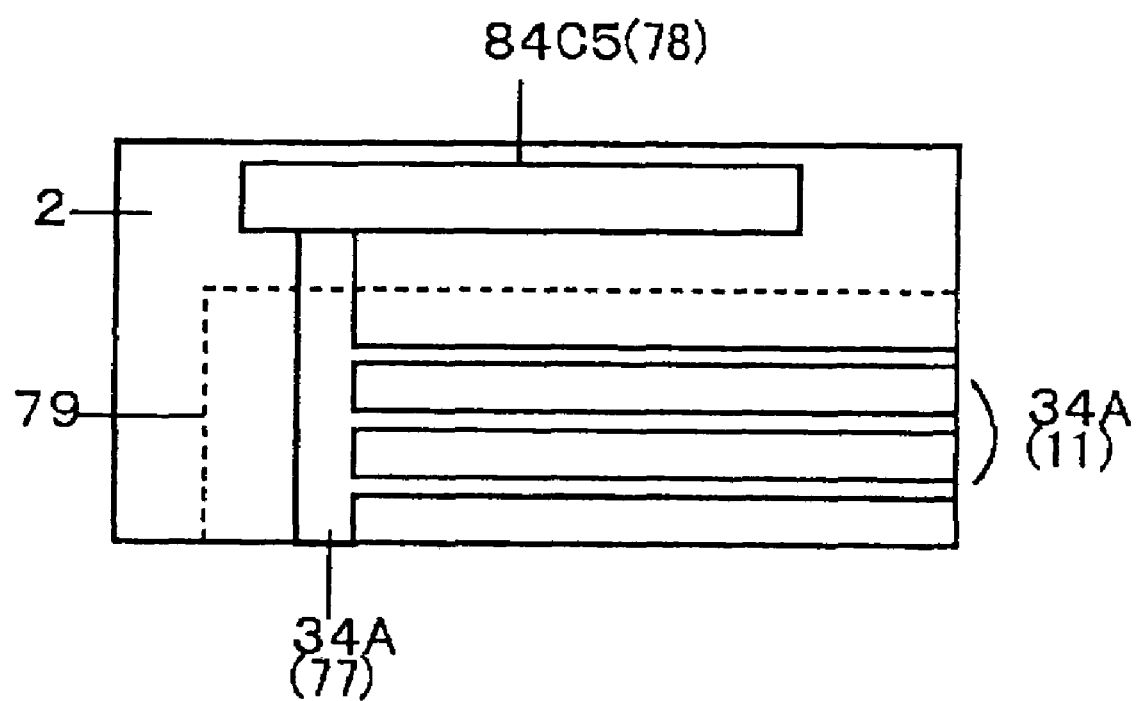
[FIG. 17] A layout view of a connection pattern for insulating layer formation in Embodiment 7
Figure 18:
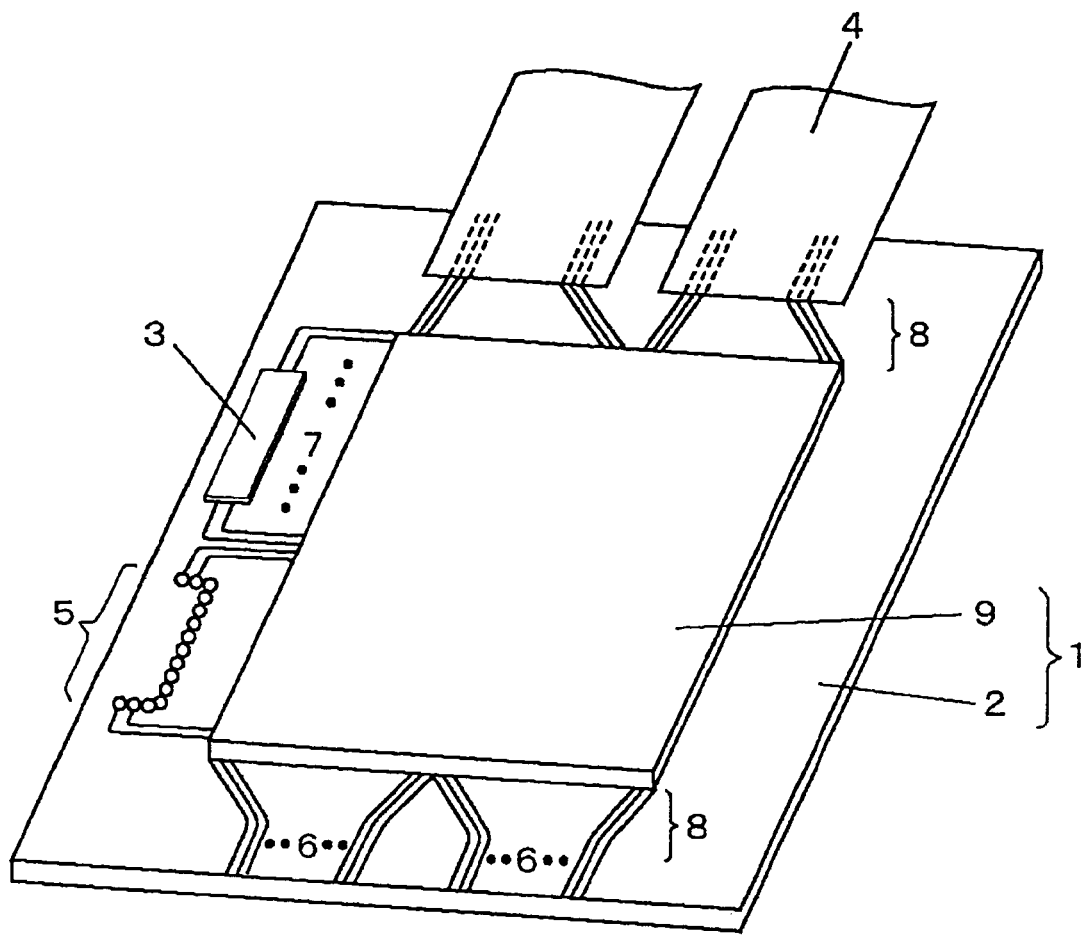
[FIG. 18] A perspective view showing the mounted state of the liquid crystal panel
Figure 19:
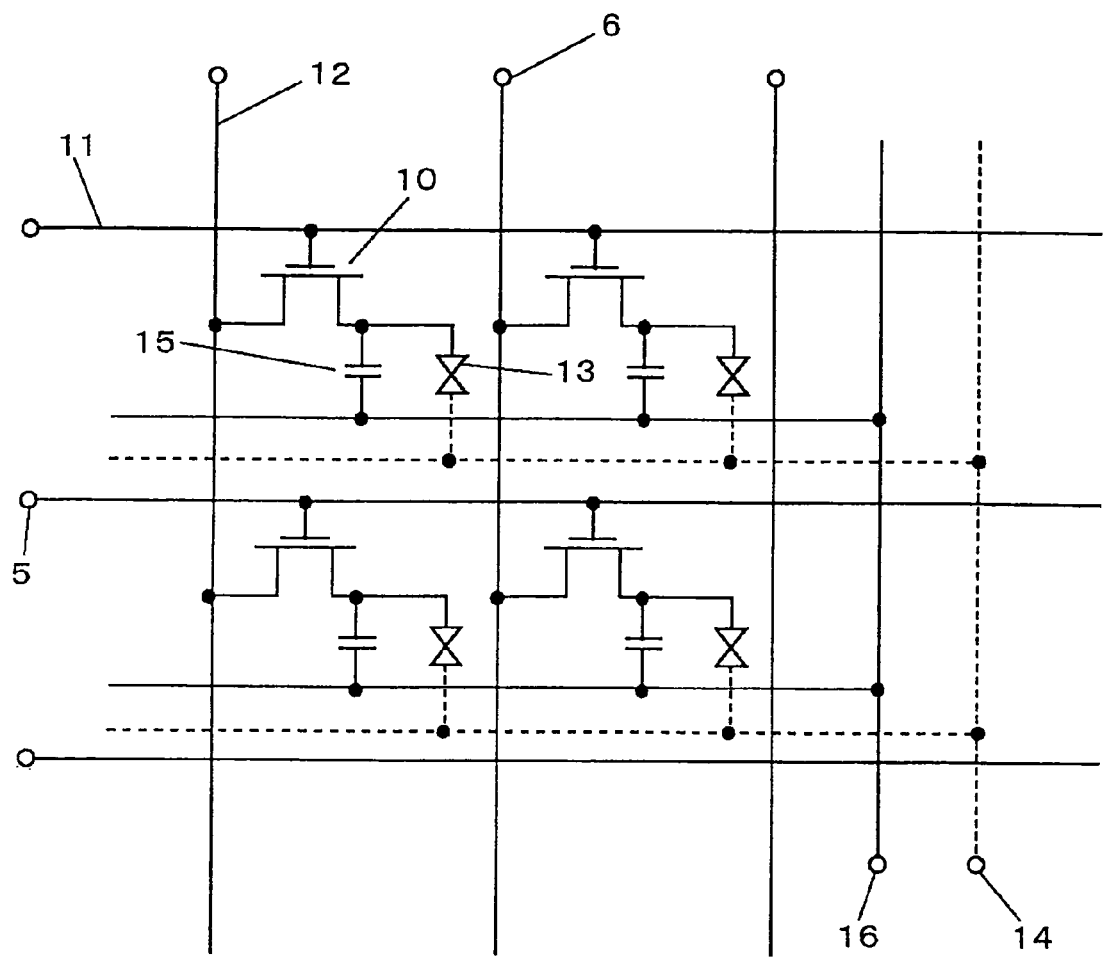
[FIG. 19] An equivalent circuit of a liquid crystal panel
Figure 20:
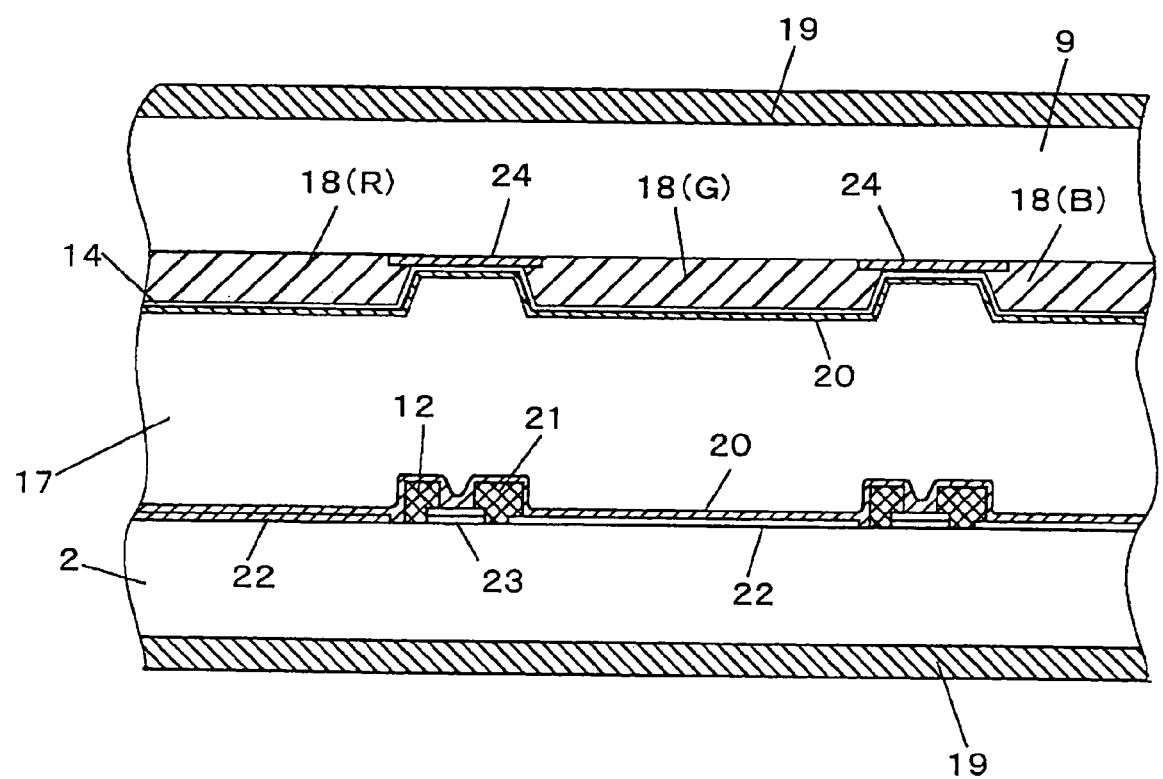
[FIG. 20] A cross-sectional view of a liquid crystal panel
Figure 21:
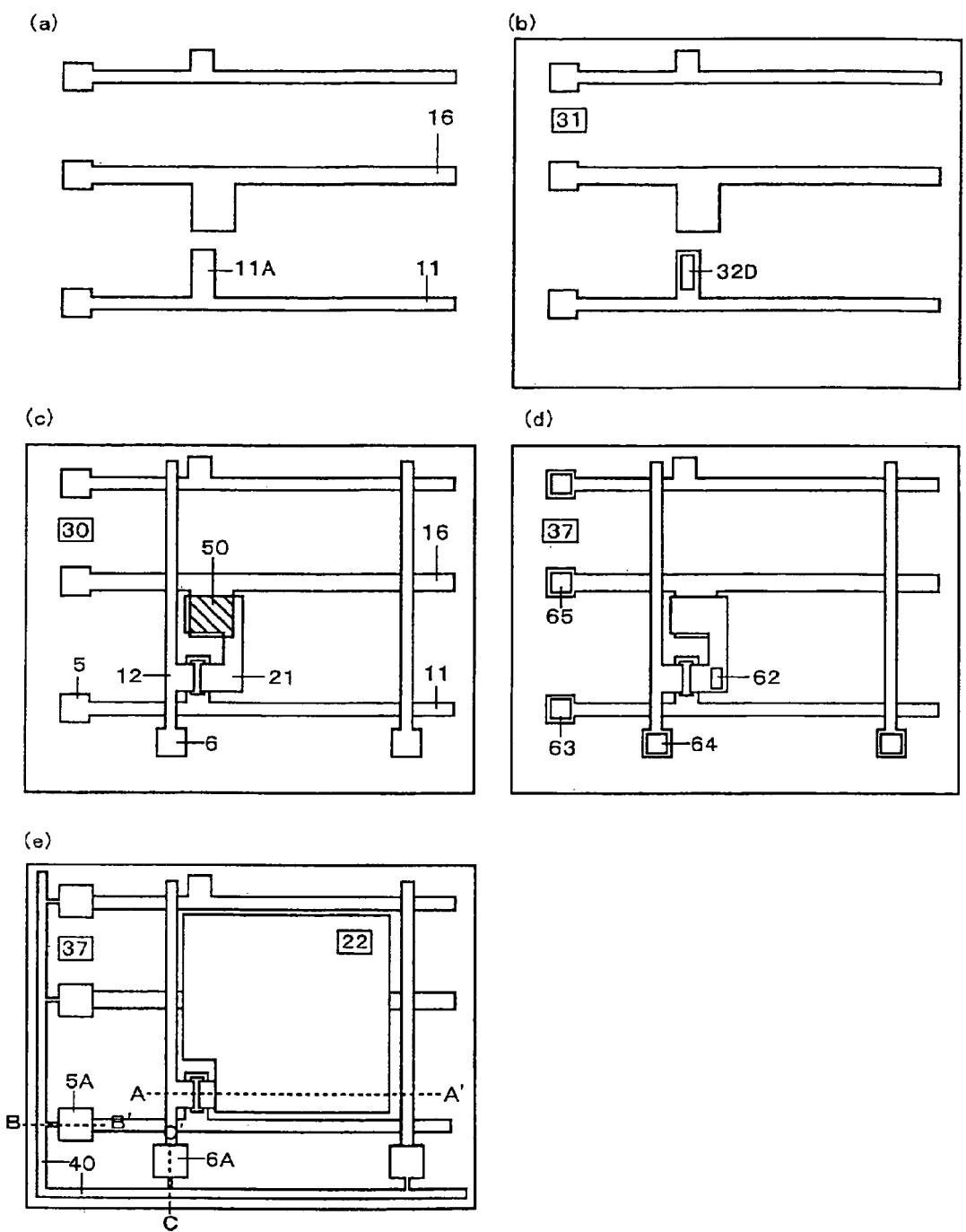
[FIG. 21] A plan view of the active substrate in the prior art example
Figure 22:
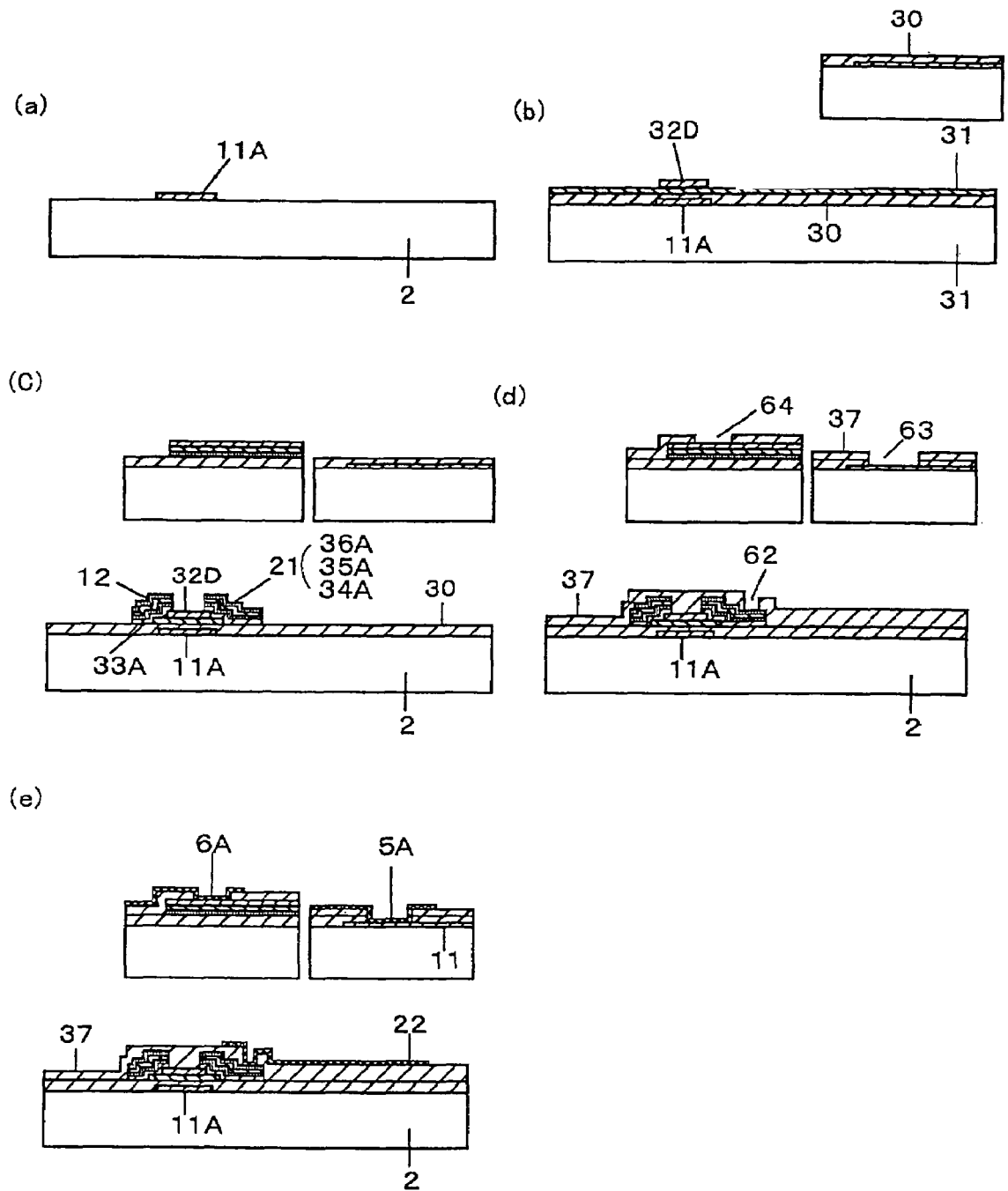
[FIG. 22] A cross-sectional view of the manufacturing process for the active substrate in the prior art example
Figure 23:
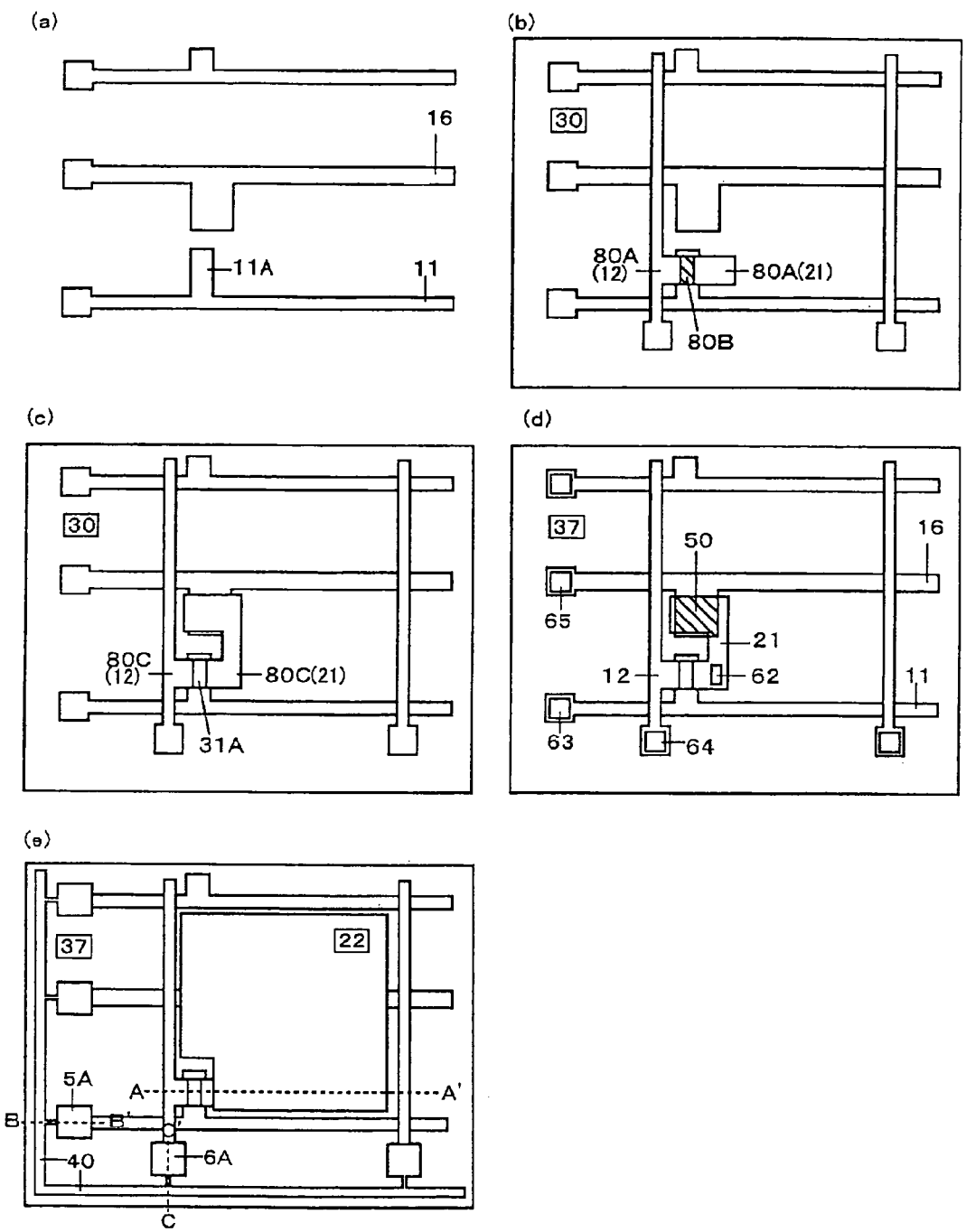
[FIG. 23] A plan view of a streamlined active substrate
Figure 24:
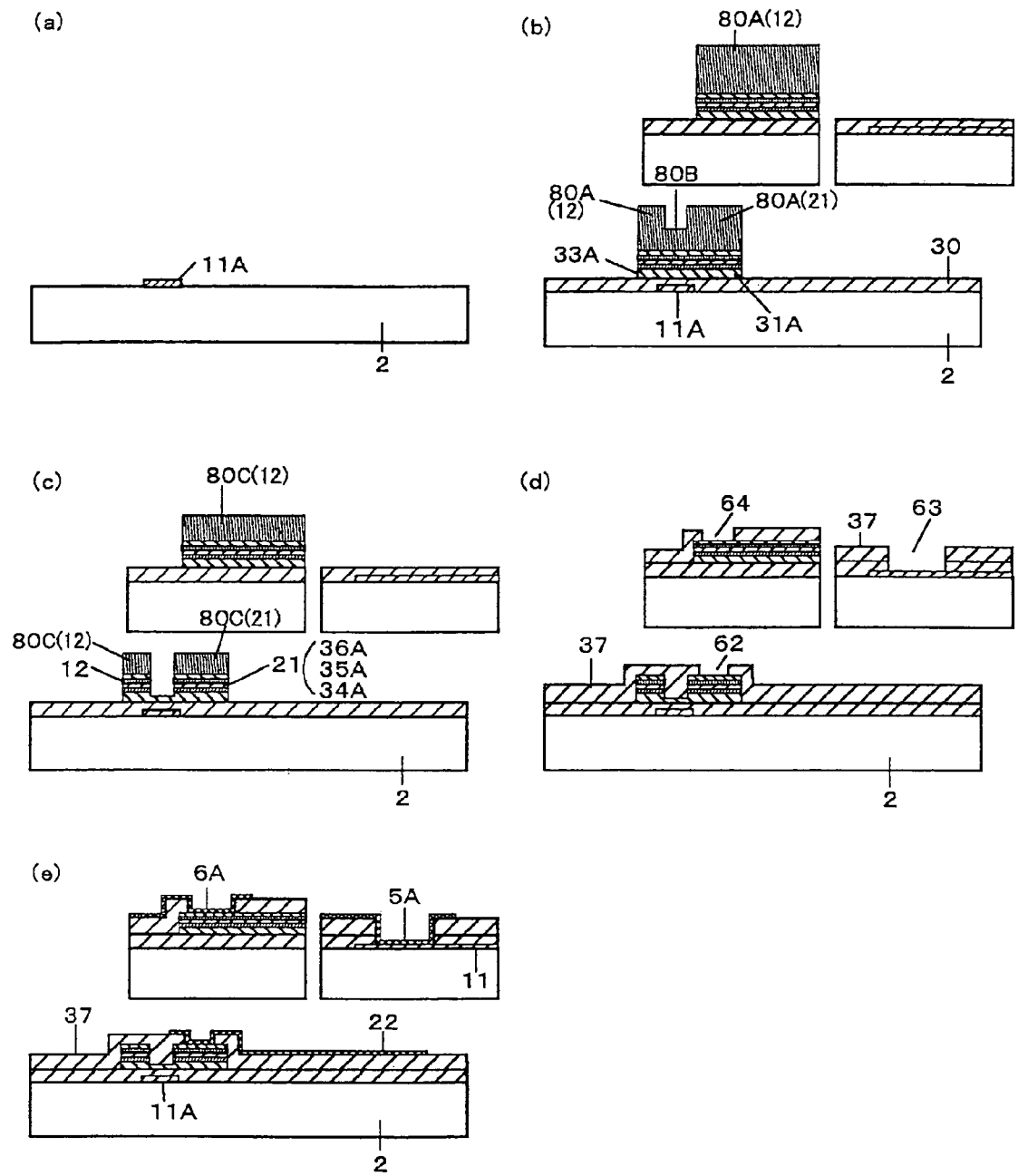
[FIG. 24] A cross-sectional view of the manufacturing process for a streamlined active substrate

Then, insulating layers 76 are formed in the sides of the gate electrodes 11A as shown in FIG. 14(b). Because of this, a connection pattern 78 is needed to provide potential during anodization or electro-deposition at the outer periphery of the glass substrate 2 and the wire 77 bundled in parallel with the scan lines 11 (as with the storage capacitor lines 16 whose illustration is omitted), and a film-depositing region 79 is limited to inside the pattern 78 using suitable mask means for the amorphous silicon layers 31 and 33 and the silicon nitride layers 30 made with a PCVD equipment, and the heat-resistant metal layer 34 made with an SPT equipment; at the least, it must be possible to provide potential to the connection pattern 78 as shown in FIG. 17. A photosensitive resin pattern 84C6 (78) on the connection pattern 78 is therefore pierced to provide a positive potential to the connection pattern 78 (scan lines 11), causing a chemical solution whose main ingredient is ethylene glycol to penetrate the glass substrate 2 and anodize using connection means such as an alligator clip having sharp points, and an aluminum oxide (Al2O3) layer, which is an anodized layer, or a polyimide resin layer using a polyimide electro-deposition solution including a pendant carboxyl group through electro-deposition is formed.

Continuing, laminates comprising the heat-resistant metal layers 34A, the second amorphous silicon layers 33A, the first amorphous silicon layers 31A, and the gate insulating layers 30A are selectively left on the gate electrodes 11A and on the regions proximate to where the scan lines 11 and the signal lines 12 intersect using the reduced photosensitive resin patterns 84C1 to 84C4 as masks; laminates comprising the heat-resistant metal layer 34B, the second amorphous silicon layers 33B, the first amorphous silicon layers 31B, and the gate insulating layers 30B are left on the greater part of the storage capacitor lines 16 and on the regions proximate to where the storage capacitor lines 16 and the signal lines 12 intersect; the heat-resistant metal layers 34A, the second amorphous silicon layers 33A, the first amorphous silicon layers 31A, and the gate insulating layers 30A on the scan lines 11 are etched to expose the scan lines 11, and at the same time, the heat-resistant metal layers 34B, the second amorphous silicon layers 33B, the first amorphous silicon layers 31B, and the gate insulating layers 30B on the storage capacitor lines 16 are etched to expose the storage capacitor lines 16 except the storage capacitor formation regions as shown in FIG. 13(c) and FIG. 14(c). gate-type transistor including impurities are successively deposited about 0.3, 0.2, and 0.05 μm thick, for example, over the entire surface of the glass substrate 2 using a PCVD equipment. Then a thin film layer 34 comprising a heat-resistant metal layer of, for example, Ti, Cr, Mo, or the like, or a silicide thereof is deposited as a heat-resistant metal layer about 0.1 μm thick using an SPT or other vacuum film-depositing equipment. Then photosensitive resin patterns 84A1 to 84A4 and 84B are formed using half-tone exposure technology such that the thickness of the regions 84A1 at the semiconductor layer formation regions, that is, above the gate electrodes 11A, 84A2 proximate to the regions where the scan lines 11 and the signal lines 12 intersect, 84A3 proximate to the regions where the storage capacitor lines 16 and the signal lines 12 intersect, and 84A4 above the storage capacitor formation regions, that is, the greater part of the storage capacitor 16 lines are 2 μm, for example, and the thickness of the photosensitive resin patterns 84B corresponding to the scan lines 11 doubling as the gate electrodes 11A and the storage capacitor lines 16 is 1 μm, and the metal layer 92 is selectively removed in addition to the heat-resistant metal layer 34, the second amorphous silicon layer 33, the first amorphous silicon layer 31, and the gate insulating layer 30 to expose the glass substrate 2 using the photosensitive resin patterns 84A1 to 84A4 and 84B as masks as shown in FIG. 13(a) and FIG. 14(a).

After obtaining the multi-layer film patterns corresponding to the storage capacitor lines 16 and the scan lines 11 doubling as the gate electrodes 11A in this manner, the said photosensitive resin patterns 84A1

After the said photosensitive resin patterns 84C1 to 84C4 are removed, IZO or ITO, for example, or a mixture thereof is deposited as a transparent conductive layer 91 about 0.1 to 0.2 μm thick using an SPT or other vacuum film-depositing equipment over the entire surface of the glass substrate 2, and an Al or Al (Nd) alloy thin film layer 35 about 0.3 μm thick is subsequently deposited as a low resistance metal layer. Then the Al or Al (Nd) alloy thin film layer 35, the transparent conductive layer 91, and the second amorphous silicon layer 33A is etched and thereby removed using micro-fabrication technology, and the first amorphous silicon layer 31A is etched to leave about 0.05 to 0.1 μm, and source wires 12 doubling as signal lines comprising a laminate made of 91A and 35A, and drain electrodes 21 for insulating gate-type transistors doubling as pseudo-pixel electrodes P22 comprising a laminate made of 91B and 35B are thereby selectively formed such as to partially overlap with the semiconductor layer regions 34A (the gate electrodes 11A) as shown in FIG. 13(d) and FIG. 14(d), and forming pseudo-electrode terminals P5 of the scan lines containing part of the exposed scan lines 11, and forming pseudo-electrode terminals P6 composing part of the signal lines 12 at the same time as the formation of the source-drain wires 12 and 21.

After the formation of the source-drain wires 12 and 21, a second SiNx layer about 0.3 μm thick is deposited as a transparent insulating layer over the entire surface of the glass substrate 2 using a PCVD equipment to make a passivation insulating layer 37, openings 38, 63 and 64 are formed on the pseudo-pixel electrodes P22 and the pseudo-electrode terminals P5 and P6, respectively, as shown in FIG. 13(e) and FIG. 14(e), and the passivation insulating layer and the low resistance metal layers 35A to 35C in the openings are removed to expose the transparent conductive pixel electrodes 22 and the greater part of the transparent conductive electrode terminals 5A and 6A.

The active substrate 2 thus obtained and the color filter 9 are attached together to form a liquid crystal panel, thereby completing Embodiment 7 of the present invention. The construction of a region 51 (a right-slanting oblique portion) on which the pixel electrode 22 and the storage capacitor line 16 are overlaid in a planar fashion via the heat-resistant metal layer 34B, the second amorphous silicon layer 33B, the first amorphous silicon layer 31B, and the gate insulating layer 30B exemplifies the storage capacitor 15 as shown in FIG. 13(e), and is essentially identical to that in Embodiment 3 except for the addition of the insulating layers 76.

The invention claimed is:

1. A liquid crystal display device in which liquid crystal is filled between a first transparent insulating substrate (active substrate) in which unit pixels having at least an insulating gate transistor, a scan line doubling as a gate electrode and a signal line doubling as a source wire of the said insulating gate transistor, and a pixel electrode connected to a drain wire on a main surface are arranged in a two-dimensional matrix and a second transparent insulating substrate or a color filter opposing the first transparent insulating substrate characterized by the fact that at least:

source wires doubling as signal lines and drain wires doubling as pseudo-pixel electrodes, both comprising a laminate made of a transparent conductive layer and a low-resistance metal layer sequentially, are connected to the first semiconductor layers not including impurities forming channels via second semiconductor layers including impurities and heat-resistant metal layers sequentially, wherein the heat-resistant metal layers are located between the transparent conductive layer and the second semiconductor layers including impurities, and the low-resistant metal layers of the pseudo-pixel electrodes in the openings formed in a passivation insulating layer on the first transparent insulating substrate are removed to expose transparent conductive pixel electrodes.

2. The liquid crystal display device according to claim 1 characterized in that, scan lines comprising a metal layer of one or more layers are formed on a main surface of the first transparent insulating substrate, first semiconductor layers not including impurities are formed in island shapes wider than gate electrodes through a gate insulating layer of one or more layers above the gate electrodes, a pair of source-drain electrodes comprising a laminate of a second semiconductor layer including impurities and a heat-resistant metal layer are formed to overlap the gate electrodes on the first semiconductor layers, openings are formed in a gate insulating layer on the scan lines to expose part of the scan lines in the openings outside an image display region, signal lines comprising a laminate made of a transparent conductive layer and a low-resistance metal layer are formed on the source electrodes and on the gate insulating layer, transparent conductive pixel electrodes are formed on the drain electrodes and on the gate insulating layer having low-resistance metal layers laminated in peripheries thereof, transparent conductive electrode terminals of the scan line are formed containing the said openings on the gate insulating layer, and transparent conductive electrode terminals of the signal line composing part of the signal lines are formed outside an image display region, and a passivation insulating layer having openings on the pixel electrodes and on the electrode terminals of the scan line and the signal lines are formed on the first transparent insulating substrate.

3. A manufacturing method for a liquid crystal device in which liquid crystal is filled between a first transparent insulating substrate (active substrate) in which unit pixels having at least an insulating gate-type transistor, a scan line doubling as a gate electrode and a signal line doubling as a source wire of the said insulating gate-type transistor, and a pixel electrode connected to a drain wire are arranged in a two-dimensional matrix and a second transparent insulating substrate or a color filter opposing the first transparent insulating substrate having at least:

a process for forming semiconductor layers comprising a laminate made of a first semiconductor layer not including impurities, a second semiconductor layer including impurities, and a heat-resistant metal layer sequentially, above the gate electrodes through the gate insulating layer, a process for forming source wires for insulating gate-type transistors doubling as signal lines and drain wires doubling as pseudo-pixel electrodes, both comprising a laminate made of a transparent conductive layer and a low-resistance metal layer sequentially, wherein the heat-resistant metal layers are located between the transparent conductive layer and the second semiconductor layers including impurities, and a process for forming openings on the said pseudo-pixel electrodes after a passivation insulating layer is deposited, and for removing the passivation insulating layer and the low-resistance metal layer to expose transparent conductive pixel electrodes.

4. A manufacturing method for the liquid crystal display device recited in claim 3 having, a process for forming scan lines comprising a first metal layer of one or more layers on a main surface of the first transparent insulating substrate, a process for successively depositing a gate insulating layer having one or more layers, a first amorphous silicon layer including no impurities, a second amorphous silicon layer including impurities, and a heat-resistant metal layer, a process for forming laminates comprising the heat-resistant metal layer, the second amorphous silicon layer, and the first amorphous silicon layer wider than the gate electrodes in island shapes above the gate electrodes to expose the gate insulating layer, a process to form openings in a gate insulating layer on the scan lines outside an image display region to expose part of the scan lines, a process for selectively removing the low-resistance metal layer, the transparent conductive layer, the heat-resistant metal layer, and the second amorphous silicon layer after depositing a transparent conductive layer and a low-resistance metal layer, and forming source wires (signal lines) and the drain wires composing the pseudo-pixel electrodes, both comprising a laminate made of a low-resistance metal layer and a transparent conductive layer such as to partially overlap the gate electrodes on the gate insulating layer, and forming pseudo-electrode terminals of the scan lines comprising a laminate made of a low-resistance metal layer and a transparent conductive layer containing the said openings, and forming pseudo-electrode terminals of the signal lines composing part of the signal lines outside an image display region, and a process for forming openings on the said pseudo-pixel electrodes and on the pseudo-electrode terminals of the scan lines and the signal lines after depositing a passivation insulating layer, and removing the passivation insulating layer and the low-resistance metal layer to expose the transparent conductive pixel electrodes and transparent conductive electrode terminals of the scan lines and the signal lines.

5. The liquid crystal display device according to claim 1 characterized in that, scan lines comprising a metal layer of one or more layers is formed on a main surface of the first transparent insulating substrate, laminates made of a gate insulating layer and a first semiconductor layer not including impurities are formed in island shapes on the gate electrodes wider than the gate electrodes and also formed in island shapes wider than the scan lines proximate to the intersections of the scan lines and the signal lines, a pair of source-drain electrodes comprising a laminate of a second semiconductor layer including impurities and a heat-resistant metal layer are formed such as to overlap the gate electrodes on the first semiconductor layers above the gate electrodes, and laminates made of a second semiconductor layer including impurities and a heat-resistant metal layer are formed in island shapes on the first semiconductor layers at the intersections of the scan lines and the signal lines, signal lines comprising a laminate made of a transparent conductive layer and a low-resistance metal layer are formed on the source electrodes, on the first transparent insulating substrate, and on the heat-resistant metal layers above the intersections of the scan lines and the signal lines, transparent conductive pixel electrodes are formed on the drain electrode and on the first transparent insulating substrate having low-resistance metal layers laminated in the peripheries thereof, transparent conductive electrode terminals of the scan line are formed containing part of the scan lines on the first transparent insulating substrate outside an image display region, and transparent conductive electrode terminals of the signal lines composing part of the signal line are formed outside an image display region, and a passivation insulating layer having openings on the pixel electrodes and on electrode terminals of the scan lines and the signal lines is formed on the first transparent insulating substrate.

6. The liquid crystal display device according to claim 1 characterized in that, scan lines comprising a metal layer of one or more layers with insulating layers on their sides are formed on a main surface of the first transparent insulating substrate, gate insulating layers of one or more layers are formed on the scan lines, first semiconductor layers not including impurities are formed in island shapes on the gate insulating layers above the gate electrodes, a pair of source-drain electrodes comprising a laminate made of a second semiconductor layer including impurities and a heat-resistant metal layer are formed on the first semiconductor layers, openings are formed in the gate insulating layers on the scan lines to expose part of the scan lines in the openings outside an image display region, signal lines comprising a laminate made of a transparent conductive layer and a low-resistance metal layer are formed on the source electrodes and on the first transparent insulating substrate, transparent conductive pixel electrodes are formed on the drain electrodes and on the first transparent insulating substrate having low-resistance metal layers laminated in the peripheries thereof, transparent conductive electrode terminals of the scan lines are formed on the openings and on laminates made of the first semiconductor layer, the second semiconductor layer, and the heat-resistant metal layer at the peripheries of the openings, and transparent conductive electrode terminals of the signal lines are formed composing part of the signal lines outside an image display region, and a passivation insulating layer having openings on the pixel electrodes and on the electrode terminals of the scan lines and the signal lines is formed on the said first transparent insulating substrate.

7. The liquid crystal display device recited in claim 1 characterized in that, scan lines comprising a metal layer of one or more layers with insulating layers on their sides are formed on a main surface of the first transparent insulating substrate, gate insulating layers of one or more layers are formed on the scan lines, first semiconductor layers not including impurities are formed in island shapes on the gate insulating layers above the gate electrodes, a pair of source-drain electrodes comprising a laminate made of a second semiconductor layer including impurities and a heat-resistant metal layer are formed on the said first semiconductor layers, openings are formed in the gate insulating layers on the scan lines to expose part of the scan lines in the openings outside an image display region, signal lines comprising a laminate made of a transparent conductive layer and a low-resistance metal layer are formed on the source electrodes and on the first transparent insulating substrate, transparent conductive pixel electrodes are formed on the drain electrodes and on the first transparent insulating substrate having low-resistance metal layers in peripheries thereof, transparent conductive electrode terminal of the scan line are formed containing the openings, and transparent conductive electrode terminals of the signal line are formed composing part of the signals line outside an image display region, and a passivation insulating layer having openings on the plxel electrodes and on the electrode terminals of the scan line and the signal lines is formed on the first transparent insulating substrate.

8. The liquid crystal display device according to claim 1 characterized in that, scan lines comprising a metal layer of one or more layers and with insulating layers on their sides are formed on a main surface of the first transparent insulating substrate, gate insulating layers of one or more layers are formed on the scan lines, first semiconductor layers not including impurities are formed in island shapes slightly smaller than the gate insulating layers on the gate insulating layers above the gate electrodes, a pair of source-drain electrodes comprising a laminate made of a second semiconductor layer including impurities and a heat-resistant metal layer are formed on the first semiconductor layers, openings are formed in the gate insulating layers on the scan lines to expose part of the scan lines in the openings outside an image display region, signal lines comprising a laminate made of a transparent conductive layer and a low-resistance metal layer are formed on the source electrodes and on the first transparent insulating substrate, transparent conductive pixel electrodes are formed on the drain electrodes and on the first transparent insulating layer having low-resistance metal layers in peripheries thereof, transparent conductive electrode terminals of the scan lines are formed containing the openings, and transparent conductive electrode terminals of the signal lines composing part of the signal lines are formed outside an image display region, a passivation insulating layer having openings on the pixel electrodes and on the electrode terminals of the scan lines and the signal line is formed on the said first transparent insulating substrate.

9. The liquid crystal display device according to claim 1 characterized in that, scan line comprising a metal layer of one or more layers with insulating layers on their sides are formed on a main surface of the first transparent insulating substrate, laminates made of a gate insulating layer and a first semiconductor layer not including impurities are formed in island shapes above the gate electrodes and also formed in island shapes on the scan lines proximate to intersections of the signal lines and the scan lines, a pair of source-drain electrodes comprising a laminate made of a second semiconductor layer including impurities and a heat-resistant metal layer are formed on the first semiconductor layers above the gate electrodes, and laminates made of a second semiconductor layer including impurities and a heat-resistant metal layer are formed on the first semiconductor layers at intersections of the scan lines and the signal lines, signal lines comprising a laminate made of a transparent conductive layer and a low-resistance metal layer are formed on the source electrodes, on the first transparent insulating substrate, and on the heat-resistant metal layers at the intersection of the scan lines and the signal lines, transparent conductive pixel electrodes are formed on the drain electrodes and on the first transparent insulating substrate having low-resistance metal layers in peripheries thereof, transparent conductive electrode terminals of the scan lines are formed containing part of the scan lines on the first transparent insulating substrate outside of an image display region, and transparent conductive electrode terminals of the signal lines composing part of the signal lines are formed outside an image display region, and a passivation insulating layer having openings on the said pixel electrodes and on the electrode terminals of the scan lines and the signal lines is formed on the said first transparent insulating substrate.

10. A liquid crystal display device recited in claim 6, 7, 8 or 9 characterized in that insulating layers formed in the sides of the scan lines are organic insulating layers.

11. A liquid crystal display device recited in claim 6, 7, 8 or 9 characterized in that insulating layers formed in the sides of the scan lines comprising an anodizable metal layer that is a first metal layer are anodized layers thereof.

* * * * *